US007519631B2

(12) United States Patent
Roybal et al.

(10) Patent No.: US 7,519,631 B2
(45) Date of Patent: Apr. 14, 2009

(54) LIVESTOCK TRACKING AND MANAGEMENT SYSTEM

(75) Inventors: Kirk Roybal, Cypress, TX (US); Robert Bamburg, Houston, TX (US)

(73) Assignee: Champion Innovations, Ltd., Centerville, TX (US)

( * ) Notice: Subject to any disclaimer, the term of this patent is extended or adjusted under 35 U.S.C. 154(b) by 256 days.

(21) Appl. No.: 11/400,975

(22) Filed: Apr. 10, 2006

(65) Prior Publication Data

US 2007/0239723 A1 Oct. 11, 2007

(51) Int. Cl.
*G06F 17/30* (2006.01)
*G06F 12/00* (2006.01)

(52) U.S. Cl. ........................ 707/203; 707/200; 707/201

(58) Field of Classification Search ....................... None
See application file for complete search history.

(56) References Cited

U.S. PATENT DOCUMENTS

| | | | |
|---|---|---|---|
| 4,256,569 | A | 3/1981 | Wallace |
| 4,262,632 | A | 4/1981 | Hanton et al. |
| 4,617,876 | A | 10/1986 | Hayes |
| 5,008,821 | A | 4/1991 | Pratt et al. |
| 5,315,505 | A | 5/1994 | Pratt et al. |
| 5,478,990 | A | 12/1995 | Montanari et al. |
| 5,673,647 | A | 10/1997 | Pratt |
| 6,000,361 | A | 12/1999 | Pratt |
| 6,135,055 | A | 10/2000 | Pratt |
| 6,211,789 | B1 | 4/2001 | Oldham et al. |
| 6,318,289 | B1 | 11/2001 | Pratt |
| 6,342,839 | B1 | 1/2002 | Curkendall et al. |
| 6,346,885 | B1 | 2/2002 | Curkendall |
| 6,516,746 | B2 | 2/2003 | Pratt |
| 6,592,517 | B2 | 7/2003 | Pratt et al. |
| 6,664,897 | B2 | 12/2003 | Pape et al. |

(Continued)

FOREIGN PATENT DOCUMENTS

EP 0 945 060 A2 9/1999

(Continued)

OTHER PUBLICATIONS

Using PS-nets for analysis of parallel processes interaction application server, Science and Technology, 2000, KORUS 2000, Proceeding International Synposium, vol. 1, pp. 75-79, Jun. 12- Jul. 1, 2001.*

(Continued)

*Primary Examiner*—Baoquoc N To
(74) *Attorney, Agent, or Firm*—Storm LLP; Paul V. Storm; John J. Patti

(57) ABSTRACT

With the onset of BSE or Bovine Spongiform Encephalopathy in Great Britain, and subsequent infections here in the U.S., there has been an increased push to monitor and track movements of animals on ranches and farms. In fact, the U.S. Department of Agriculture is in the process of implementing a National Animal Identification System or NAIS to track animal movements. Conventional systems that comply with the NAIS, though, have been very expensive and cumbersome for the average farmer who cannot afford the expense involved. However, now there is a system, which complies with the NAIS, that is easy to operate for the average farmer or rancher and is inexpensive. Thus, the present system allows the average farmer or rancher to remain in business and comply with national requirements.

11 Claims, 23 Drawing Sheets

U.S. PATENT DOCUMENTS

| | | | | |
|---|---|---|---|---|
| 6,672,505 | B1 * | 1/2004 | Steinmetz et al. | 235/379 |
| 6,805,075 | B2 | 10/2004 | Pratt | |
| 6,963,846 | B1 | 11/2005 | Kelly et al. | |
| 7,185,810 | B2 * | 3/2007 | White | 235/385 |
| 2004/0078390 | A1 | 4/2004 | Saunders | |
| 2004/0098620 | A1 * | 5/2004 | Shay | 713/201 |
| 2004/0254800 | A1 | 12/2004 | Saunders | |
| 2006/0201432 | A1 | 9/2006 | Pratt | |

FOREIGN PATENT DOCUMENTS

| | | |
|---|---|---|
| FR | 2 590 764 A1 | 6/1987 |
| IE | 913238 | 3/1993 |
| WO | WO 94/22295 | 10/1994 |

OTHER PUBLICATIONS

Lyengar A. Design and performance of general-purpose software, Performance, Computing and Communications Conference IEEE International, pp. 329-336, Feb. 10-12, 1999.*

"Council Directive 92/102/EEC of 27 Nov. 1992 on the Identification and registration of animals," (OJ L 355, 5.12.92, p. 32), Consolidated TEXT produced by the CONSLEG System of the Office for Official Publications of the European Communities, Jan. 1, 1995 (8 pgs).

"Final Report of Mission Carried Out in The Netherlands From Mar. 18-28, 2002 in Order to Evaluate the Operation of Controls Over the Traceability of Beef and Beef Products," European Commission, Health & Consumer Protection Directorate-General, FVO Jul. 19, 2002 (20 pgs).

The BSE Inquiry: vol. 5: Animal Health, 1989-96—5. Cattle-tracking-The adequacy of existing regulations (www.bseingquiry.gov.uk/report.volume/chapte52.html), pp. 1-7.

The BSE Inquiry: vol. 5: Animal Health, 1989-96—5. Cattle-tracking-Computerisation (www.bseinquiry.gov.uk/report/volume.chapte52.html), pp. 1-13.

Agriculture Committee, Fifth Report, Bovine Spongiform Encephalopathy (BSE), Session 1989-90 (w/attachments).

McNeill, Liam, The BSE Inquiry/Statement No. 547A, 37 Supplementary Statement of L J McNeill, issued Oct. 18, 1999.

Operational Requirement for the Department of Agriculture for Northern Ireland.

Statutory Instruments, 1990 No. 1867, Animals—Animal Health—The Bovine Animals (Identification, Marketing and Breeding Records) Order 1990, pp. 4745-4749.

Statutory Instruments, 1990 No. 1868, Animals—Animal Health—The Movement of Animals (Records) (Amendment) Order 1990, pp. 4750.

Gaisford, Michael; Dutch Lead Way for Electronic Pig ID, Farmers Weekly, Oct. 12, 1990.

Farmplan—Farm Computer Solutions, "Cattle Focus", pp. 1-2, http://www.farmplan.co.uk/software/livestock/cattle_focus/cattle_focus.htm.

1.1 Agriculture & Horticulture C135 Performance Analysis & Forecasting, pp. 11-13.

* cited by examiner

LIVESTOCK TRACKING AND MANAGEMENT SYSTEM

TECHNICAL FIELD

The invention relates generally to software for management and tracking of livestock and, more particularly, to software for managing and tracking livestock that is compliant with the U.S. National Animal Identification System (NAIS).

BACKGROUND

Since the outbreak of Bovine Spongiform Encephalopathy (BSE), what is commonly referred to as "Mad Cow Disease," in Great Britain and elsewhere there has been an increased focus on tracing the location of cattle. Specifically, tracing of cattle to specific locations and/or tracing the comingling of cattle enables governmental agencies to establish the root of diseases like BSE or hoof-and-mouth disease. The systems that have been in place in the United States have been mostly voluntary and are woefully inadequate to trace cattle histories. However, because each species carries different diseases, there is not just a need to track cattle, but other livestock including poultry, swine, and so forth.

As a result of this increased push for identification and tracking systems, the livestock industry in cooperation with the U.S. Department of Agriculture (USDA) have developed the NAIS. The NAIS is a nationwide tracking system that requires anyone who owns or possess livestock must report locations and movements of the cattle and other livestock. To comply with the NAIS, each location where livestock may be present must have a premise identification number (PID), which is obtained through registration with a local, state, or federal governmental body. Additionally, each animal must have a unique identification number or electronic identification number (EID) associated with it. Each movement of an animal to a different premise must then be promptly (now, 48 hours) reported to a central database.

This type of tracking system can be very difficult and expensive to implement. Most notably, the cost and infrastructure requirements for the local component of this system could be prohibitive for most farmers, ranchers, or livestock managers. In Texas alone, 80% of the cattle are owned by ranchers or farmers who have less than 10 head. These types of farmers, ranchers, or livestock managers simply do not have the income or technical inclination to implement an expensive and complex system, forcing the smaller operations to go out of business or non-compliance.

To date, though, there have been relatively few tracking systems that are NAIS compliant. In particular, these systems add other functionality unnecessary for NAIS compliance and, thus, are extremely expensive, costing hundreds or thousands of dollars. The high costs of these NAIS compliant systems makes them preclusive for smaller farmers, ranchers, or livestock managers, who may only have a few animals.

Therefore, there is a need for a method and/or system which is inexpensive and allows small, as well as large, farmers, ranchers, or livestock managers to comply with NAIS regulations.

SUMMARY

The present invention, accordingly, provides a method in an electronic data processing system for maintaining licensure of livestock tracking software. The livestock management software is initiated or run on a local computer. The user of the local computer is requested to synchronize with a remote computer over a computer network if the livestock management software has expired. If synchronization is requested, a new key is calculated at least from indicia of livestock stored by the livestock management software and an identification number of the local computer.

In another preferred embodiment of the present invention, the date on the local computer date is compared to at least one predetermined lock condition, and access is denied to the livestock management software if the livestock management software has expired.

In an alternative embodiment of the present invention, the predetermined lock condition is an expiration date.

In another preferred embodiment of the present invention, the user is requested to enter initial livestock data, and the initial livestock data is stored. An expiration date is generated, and an initial key is calculated from at least from indicia of initial livestock and the identification number of the local computer.

In an alternative embodiment of the present invention, a determination of a media access control (MAC) address for the local computer is made. Additionally, an initial key is calculated at least from the MAC address.

The present invention also provides in another preferred embodiment of the present invention a method in an electronic data processing system for maintaining licensure of software. The software is initiated on a local computer, and user of the local computer is requested to synchronize with a host server over a computer network if the software has expired. A new key is calculated at least from indicia of data stored by the software and an identification number of the local computer, if synchronization is requested.

Additionally, the present invention provides a system for tracking and managing livestock. Specifically, the present invention includes a local computer and a remote computer. The local computer includes a local database that contains at least livestock data, a local interface adapted to communicate with at least one computer network, and a local controller which provides control instructions to the local database and the local interface, wherein the local controller includes a lock detector which prevents user access to the local database if a predetermined lock condition is met. The remote computer is connected to the computer network includes a remote database that at least contains the livestock state, a key generator which generates a key at least from indicia of livestock data, wherein the key provides at least one of an indication of the predetermined lock condition, a set of the predetermined lock condition, or a reset of the predetermined lock condition, and a remote controller which provides control instructions to the remote database, the key generator, and the local controller.

In another preferred embodiment of the present invention, the remote controller provides at least one control instruction to the local controller through an intervention by at least one human operator.

In an alternative embodiment of the present invention, the remote controller provides at least one control instruction to the local controller over the computer network.

In another preferred embodiment of the present invention, the local database contains at least livestock data and user data.

In an alternative embodiment of the present invention, the system further comprises a second local database that contains at least user data.

In another preferred embodiment of the present invention, the lock condition is a use period.

In an alternative embodiment of the present invention, the livestock are cattle.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
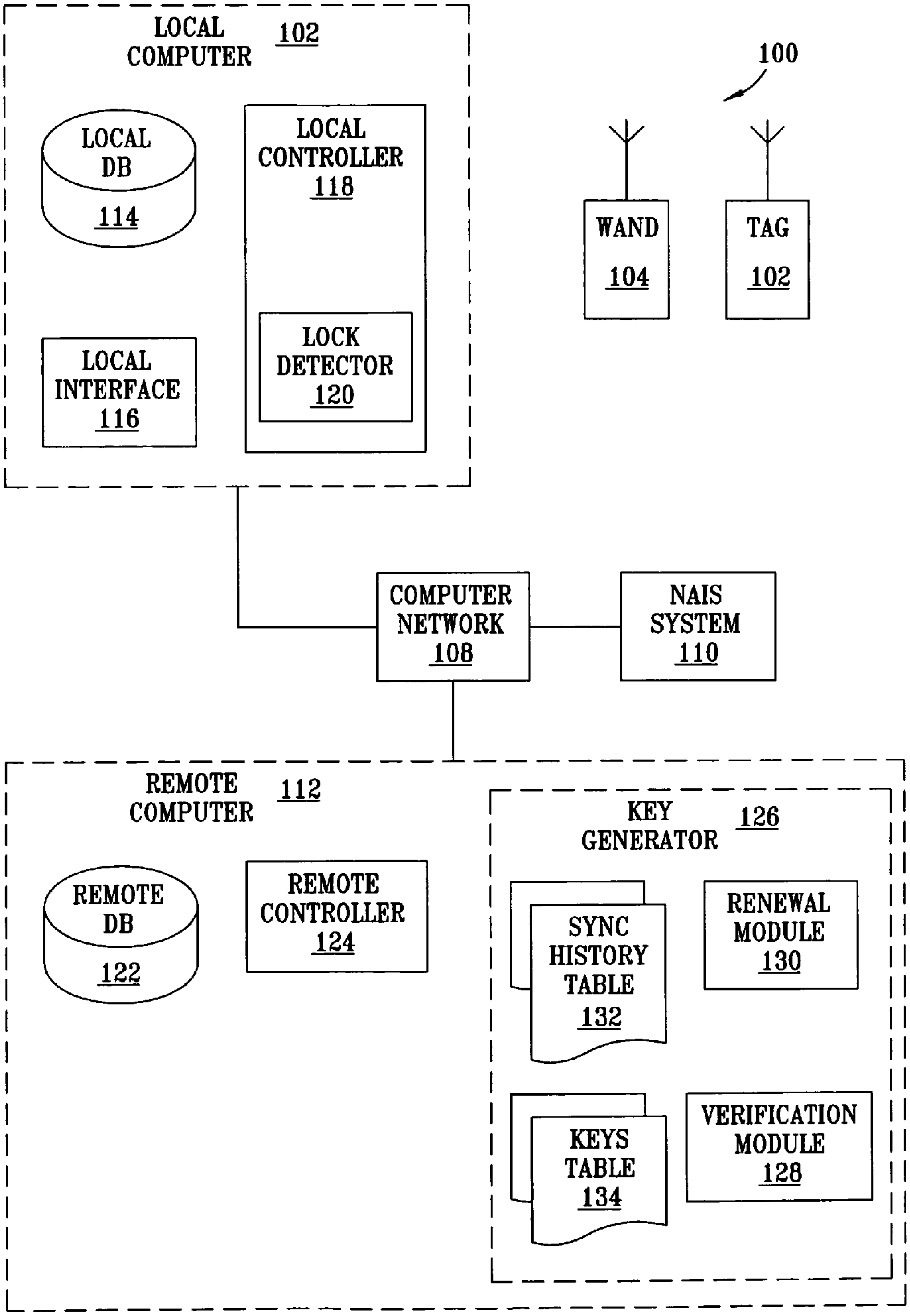
FIG. 1A-1C is a block diagram depicting a livestock management and tracking system in accordance with a preferred embodiment of the present invention.

In the discussion of the FIGURES, the same reference numerals will be used throughout to refer to the same or similar components. In the following discussion, numerous specific details are set forth to provide a thorough understanding of the present invention. In other instances, well-known elements have been illustrated in schematic or block diagram form in order not to obscure the present invention in unnecessary detail. Additionally, for the most part, details concerning timing considerations and the like have been omitted inasmuch as such details are not considered necessary to obtain a complete understanding of the present invention, and are considered to be within the skills of persons of ordinary skill in the relevant art.

A. System Overview and Operation

Referring to FIG. 1A of the drawings, the reference numeral 100 generally designates an animal tracking and management system. System 100 comprises a local computer 102, an input device or wand 104, a tag 106, a computer network 108, and a remote computer 112. The system 100 is also then designed to be compliant with the NAIS system 110.

Preferably, this system 100 enables a user to install a small and relatively unobtrusive program or software package on the local computer 102, leaving the heavy processing to the remote computer 112. Employing this configuration, it allows smaller and more undercapitalized livestock managers to utilize the system, meaning, for example, that obsolete PCs or inexpensive computers can run the software easily due to the low overhead requirements of the locally installed component.

To perform this task, a small program or software package is installed on the local computer 102. The installation process onto the local computer 102 is detailed below. Once installed, the software creates three distinct modules within the local computer 102: the local database (DB) 114, the local interface 116, and the local controller 118.

The local DB 114, preferably, is used to locally store and manage the data generated by the user or livestock manager. Specifically, the local DB 114 stores information relating to the animals. The local DB 114 can also include user information; however, an entirely different or separate DB can be employed. Control and entry of data into the local DB 114 are detailed below.

Figure 1B:
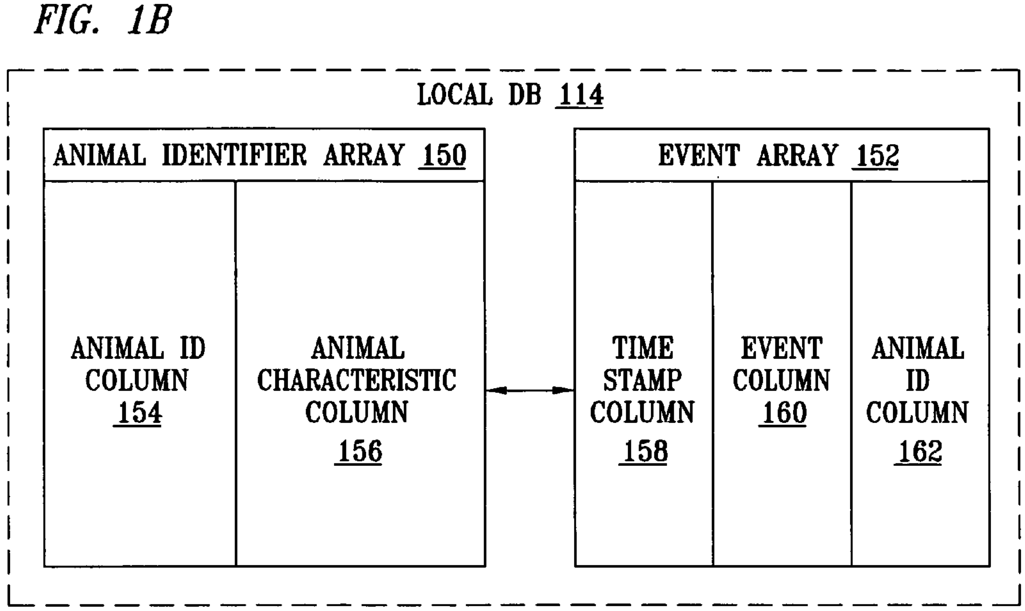
Figure 1C:
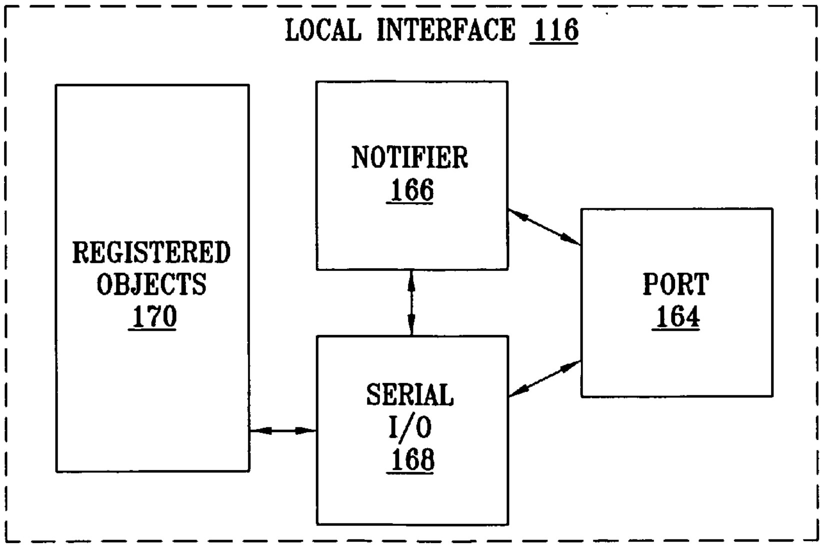

As can be seen in FIG. 1B, the local DB 114 is designed so as to easily track, update, and maintain events. Local DB 114 employs a number of interrelated arrays to maintain the accounting of data and comprises an animal identifier array 150 and an event array 152. With the animal identifier array 150, the characteristic data of livestock can be isolated from events that take place in the life of an animal. The animal identifier array contained an animal ID column 154 and an animal characteristic column 156. Thus, the characteristics of each animal can be maintained an updated in array 150.

Each animal tracked in the local DB 114 is given a unique identifier that remains with the animal for the duration of its tracking or life. Some of the characteristics of animals stored in the animal characteristic column 156 include an NAIS mandated Electronic Identifier (EID) and Visual Identifier (VID). The EID and VID are commonly associated with ear tags or other Radio Frequency Identification (RFID) tags. These tags, and identifiers, however, may not remain with an animal for the duration of its life, but instead may change, necessitated by the loss or destruction of tags and identifiers.

Thus, because the EID and VID are subject to change, neither the EID nor VID are useful as key fields. If either the EID or VID is used as a key or reference field, a change to the EID or VID can cause a corruption of data. Therefore, an internal and unalterable identifier is better suited to operate as a key field. These internal identifiers populate the animal ID column 154.

The internal identifiers are each generated when an animal is initially entered into the system 100. Preferably, the internal identifier is comprised of a 32-character string, but can be any number of characters long. The internal identifier is preferably generated by the use of a globally unique identifier (GUID) algorithm that uses four randomizers, such as the Media Access Control (MAC) address, Internet Protocol (IP) Address, time of day, date, and so forth.

Association between the array 150 and array 152 is accomplished through the internal identifiers that populate the animal ID column 162. Typically, for each event that takes place in the life of an animal, the event is recorded. Time stamps for each event are stored in the time stamp column 158 and the events are stored in event column 160. Additionally, a batch ID (not shown) can also be included in array 152, so that when multiple events occur together an association can be maintained.

The events that can take place are also enumerated. In other words, there is a set list (which can be lengthened or shortened) which are identified in column 160. As an example, Table 1 below details a list of events.

TABLE 1

| Number | Event |
|---|---|
| 1 | Dehorn |
| 2 | Castration |
| 3 | Palpation |
| 4 | Branding |

As noted, events, such as the above, are recorded (input) into the animal event array 152. Now turning back to FIG. 1A, the local interface 116 is a module that controls the interaction between the local computer 112 and external devices or networks. Specifically, the local interface 116 is able to communicate with the computer network 108. Typically, the network 108 is a packet switching network, which can include a variety of computer networks including, but not limited to, the Internet. Specifically, the connection that the local interface 116 establishes with the network 108 is a high-speed connection, such as a digital subscriber liner, a dial-up connection, or wireless connection. Specifically, the data transfer requirements are also generally low; thus, an expensive or high-speed network connection is not necessary. Furthermore, to maintain the lower costs, a dedicated Internet Service Provider (ISP) can be contracted to enable users to dial-up for the purpose of synchronizing with the remote computer 112; thus, the user need not even be a regular Internet user with an ISP account. Additionally, the local interface 116 is able to communicate with other external devices, namely wand 104.

The local interface 116 also performs a key role in increasing the efficiency of the local component of the system 100. Typically, objects that are operating as part of the local component of the system 100 compete for the use of port 164. Thus, in many conventional systems, data is not broadcast to more than one object, and object use of port 164 must be negotiated among the different objects. One particular case where competition would occur is for an EID broadcast.

Local interface 116, though, employs a notifier 166 and serial I/O 168 that effectively eliminates competition among objects. Preferably, the serial I/O 168 registers and tracks objects that would normally be in competition for port 164. When an I/O event occurs, such as an EID broadcast, the notifier 166 alerts the serial I/O 168, which then communicates certain data, such as an EID, to registered objects 170. Thus, competition for use of port 164 can be reduced.

Again, turning back to FIG. 1A, when data or information is communicated from the local computer 102 to the remote computer 112 over the computer network 108, the size of the data packets or data stream is very small. Typically, the amount of data transmitted is less than one megabyte (<1 Mb), even with a very large data file. However, data transmission can vary and can be greater than one terabyte (>1 Tb). With the small amount of data transmitted over the computer network 108, even the slowest network connections available are able to easily support the system 100. Additionally, the data transmitted over the computer network 100 can be encrypted using a variety of techniques, including but not limited to symmetric-key and antisymmetric-key cryptosystems. Some examples are Rivest-Shamir-Adleman (RSA) and a Hypertext Transfer Protocol (HTTP) Secure Socket Layer (SSL).

The wand 104 is an optional input device, but can be particularly useful for high-volume circumstances where cattle are being tracked and managed in larger numbers. Each cow or bull is equipped with a tag 106. This tag 106 can include a representation of a unique identifier associated with an animal, such as a VID, a bar code, an EID, or any combination thereof. Specifically, when the tag 106 operates as an RFID tag or includes a bar code, the wand 104 is able to interact with the tag 106. When the wand 104 interacts with tag 106, the data for the animal is associated with the representation of the unique identifier. As an alternative to the wand 104, data from the tag can be simply read and keyed into the software of the present invention.

To provide control, the local DB 114 and/or the local interface 116, the local controller 118 provides control instructions. Preferably, the local controller 118 controls access and information or data changes to the local DB 114. Additionally, the local controller 118 includes a lock detector 120. Preferably, the lock detector 120 sets and monitors predetermined lock condition(s). For example, an expiration period or date can be set, allowing the user to utilize the system 100 for a predetermined period of time, such as 60 or 90 days. Additionally, the lock detector 120 is equipped to monitor the Media Access Control (MAC) address, Internet Protocol (IP) address, or other unique identifier associated with a specific computer, so that the system 100 can be limited to a set of registered computers. In other words, if a lock condition is satisfied, the software is rendered inoperable until the user takes the steps necessary to remove the lock condition(s).

Figure 3:
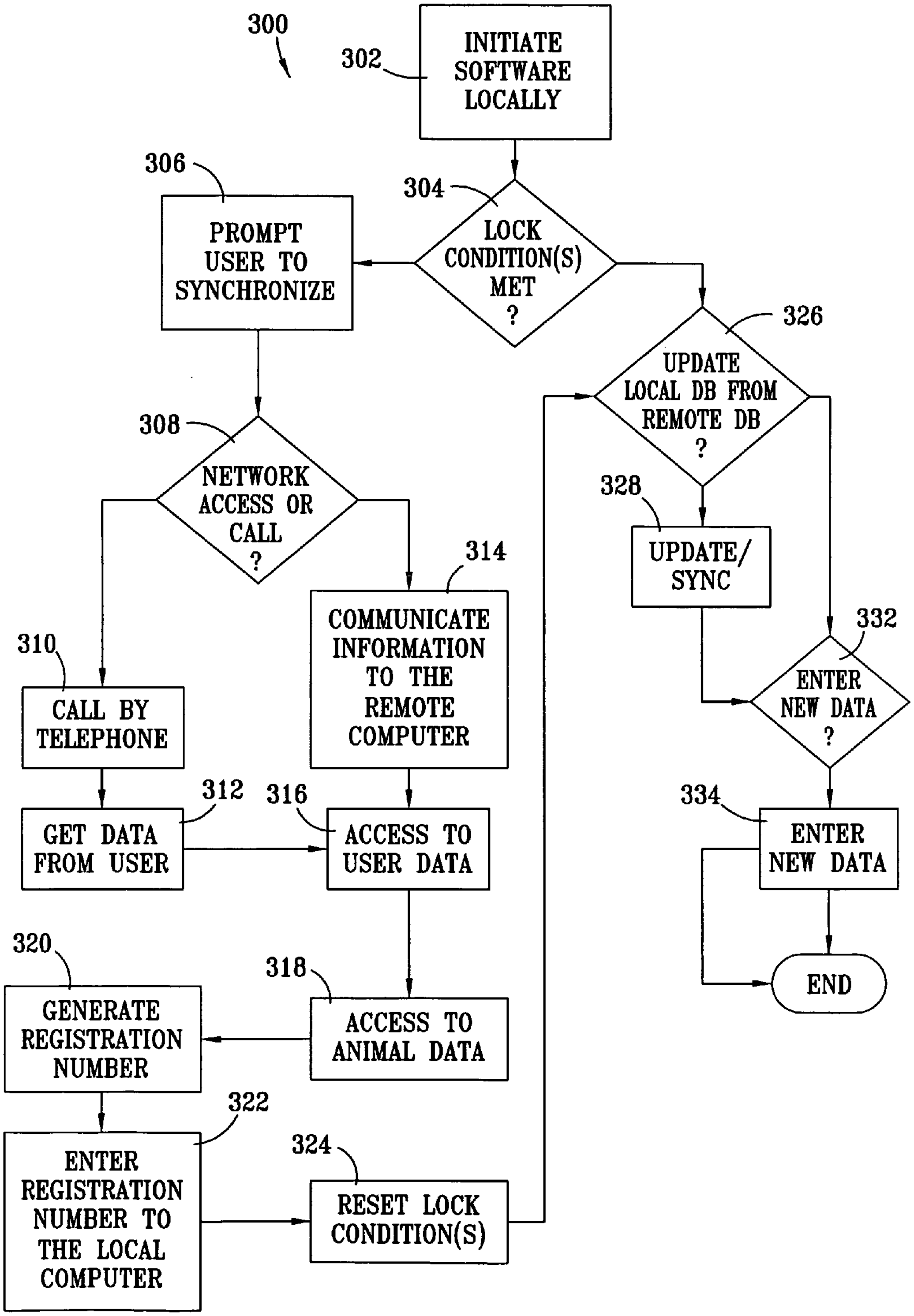
FIG. 3 is a flow chart depicting the synchronization process between the local computer and remote computer.

The lock condition(s) that are detected and monitored by the lock detector 120 are changed and/or modified through the use of a registration number or key. Specifically, this key is an alpha-numeric string and is obtained through synchronization with the remote computer 112. Synchronization is illustrated in FIG. 3 and is described in detail below. Additionally, the generation of the key is performed remotely so as to maintain the integrity of the system 100.

During operation, the remote computer 112 is also connected to the computer network 108. This connection with the computer network 108 allows the remote computer 112 to communicate with the local computer 102 (if connected). Typically, the remote computer 112 is a server which performs tracking on a large scale and maintains a large DB of multiple users or livestock managers. Installed on the remote computer 112 are several software modules, subroutines, or files, namely a remote DB 122, a remote controller 124, and a key generator 126. The remote DB 122, typically, stores information to a variety of different local DB, such as local DB 114. The remote controller 124 provides control instructions to the remote DB 122 and the key generator 126.

The key generator 126, typically, generates the lock/unlock condition(s) for lock detector 120. At the system login, the local computer 102, operating as a client, transmits an alpha-numeric login password to the verification module 128, where the verification module reads and identifies the login password. Identification of the login password allows the key generator 126 to access the sync history table 132 and keys table 134 associated with the alpha-numeric login password. Specifically, this alpha-numeric password is a hardcoded password that is unique to each copy of the software package and, typically, is a string of approximately twenty-two characters.

Once the login password is transmitted to the verification module 128, a key is transmitted to a CheckActivate sequence, sub-module, or subroutine, which validates the user's account on the system, returning a Boolean value. If a failure value is returned, the user is advised to update the paid subscription, and the system 100 will not continue with any key generation. In addition to both timing and lock condition(s) that can suspend operation of the software, an inactive account can suspend operation of the software as well. Alternatively, if a success value is returned, the user's key is updated.

Specifically, there are several ways to update the key. One example is to have an alpha-numeric string from which a date can be parsed. The renew module 130 parses the expiration date information from the key, and calculates a new key where the previous expiration date is extended by 90 days. This new key will reset the lock detector 120 so that the lock condition(s) are satisfied in 90 days. This new key can also be added to the keys table 134 associated with the login password. Another example of a way to update the key is to have an alpha-numeric string generated from data stored in the local DB 114 and/or the remote DB 122, such as the number of animals.

In addition to the remote computer 112, the system 100 is compliant with the NAIS system 110, which includes a national database that tracks animals nationwide. In particular, the remote computer 112 operates as an intermediate server for the local computer 102. As it is well known, standards and system configurations are not uncommon. In fact, change in the operation of the NAIS system 110 can almost be expected. However, because most of the users of the system 100 are not sufficiently sophisticated and/or capitalized to keep up with changes in the NAIS system 110, the system 100 allows experts to continually parse and update information sent by the individual users to the remote computer 112 to ensure that records are compliant with the NAIS system 110.

Figure 2:
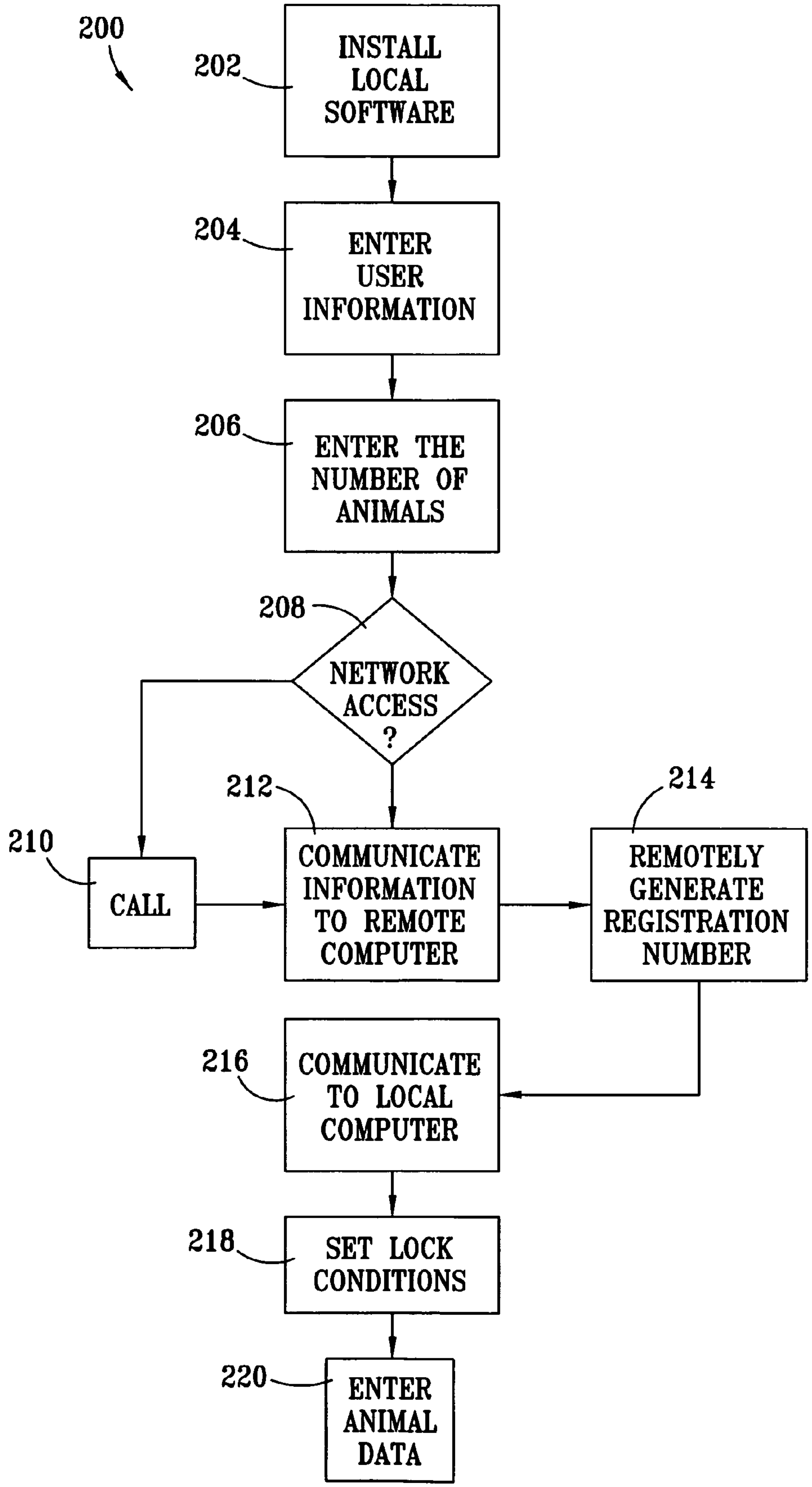
FIG. 2 is a flow chart depicting the initial installation process of the tracking software on a local computer.

As shown in FIG. 2, the flow chart 200 depicts the activation on the local computer. Initially in step 202, the program installs itself onto the local computer 102, commonly referred to as the local component. During installation, the registry is updated, and executable files, libraries, and so forth are stored locally. Once installed, the user is permitted in step 204 to enter user data, for example name, address, phone number, and so forth. The user would then be permitted to enter the number of animals that the system 100 would be tracking and/or managing in step 206.

Because the level of technical sophistication of some of the livestock managers or users is expected to be relatively low, a determination in step 208 would then be made as to whether there is access to the computer network 108. If no network access exists, the user would be permitted to call the operator of the system in step 210. In fact, a user can have the option of personally calling a call center instead of simply gaining access to the system 100 through computer network 108. In these circumstances, the operator would enter information into the system 100 on the server or remote computer 112 side in step 212. Alternatively, if there is network access (e.g. DSL), information can be reported to the remote computer 112 in step 212.

Based on the information communicated to the remote computer 112, a key is generated in step 214. This key sets/resets the lock condition(s) for the local computer 102 and is generated remotely so as to maintain the integrity of the system. The process for generating the key is detailed above. Once generated, the key is communicated to the local computer 102, either by the operator or over the computer network 108, in step 216. Once the key is entered into the local computer 102, the key enables the lock detector 120 to set/reset the lock condition(s) for the software installed on the local computer 102 in step 218. The process for setting or resetting after the lock condition(s) have been set or reset, the user is permitted to enter animal data in step 220.

In addition to installing software locally, the lock condition(s) established by the system 100, which permit authorized users to use the system, must be periodically reset. Referring to FIG. 3 of the drawings the reference numeral 300 generally designates the synchronization process between the local computer 102 and remote computer 108. In step 302, the software is initiated locally, and each time the software is locally initiated, the synchronization process 300 is executed.

In step 304, a determination is made whether specific lock condition(s) have been met. One example of a lock condition is a predetermined date, allowing for expiration after a predetermined period of time, such as 60 or 90 days. If the lock condition(s) have been satisfied (and the software is inoperable), the user is prompted to synchronize in step 306. At this point, the user is requested to either call or access the remote computer 112 over the computer network 108 in step 308. If the user chooses to call, a call is directed to an operator in step 310, who enters data from the user into the remote computer 112 in step 312. Otherwise, in step 314, data is communicated from the local computer 102 to the remote computer 112 over computer network 108.

If either the data is communicated through an operator or over the computer network 108, access by the key generator 126 to user data is provided in step 316, and access by the key generator 126 to animal data is provided in step 318. Once access is granted, the key is generated in step 320. The process for generating the key is described above. The key then can be entered into the local computer 102, either manually by the user or over the computer network 108 in step 322. The lock detector 120 reads this key, decodes it, and resets the lock condition(s), such as the predetermined expiration date, in step 324. The process for decoding and resetting or setting the lock condition(s) is described above.

After the system 100 has been unlocked in step 324 or, alternatively, if the lock conditions have not been met in step 304, the system 100 is at the user's disposal. The user can update/synchronize the local DB 114 from data in the remote DB 122 in steps 326 and 328. Preferably, performance of steps 326 and 328 are server controlled, but system 100 can be configured to allow the client to push/pull data. When client controlled, the user may decide to update the local DB 114 from the remote DB 122 in cases of disaster recovery, and when server controlled, the system 100 automatically updates/synchronizes the local DB 114 with the remote DB 122. Thus, the system 100, provides inherent disaster recovery of data in cases where the local computer 102 is damaged or destroyed or where data has been corrupted. During the data synchronization, an Extended Markup Language (XML) document is transmitted to the remote computer 112; additional, a similar XML document can be transmitted from the remote computer 112 to the local computer 102 during disaster recovery or otherwise similar situations. Preferably, the XML file is passed to a Structured Query Language (SQL) server running on the remote computer 112, where the XML file can be parsed.

When parsing the XML file, each record of an animal or movement can be categorized as follows: unchanged, new, updated, and deleted. To determine the status of each record, a comparison is made between each record and the XML file records. Based on any changes, deletions, updates, and additions, the dates for changes are recorded as well. Once record synchronization is complete, the date and whether the synchronization was successful or failed is recorded into the sync history table 132.

The XML file used for system 100 is a basic or terse XML format that does not require any specific parsers or any other third party interpretation or manipulation software. Essentially, the XML file contains attributes and values. This raw XML format allows for easier cross-platform integration and for less data to be transmitted over computer network 108. Additionally, to maintain data integrity, each piece of editable information or data has three associated time stamps: CDATE, MDATE, and DDATE. The CDATE indicates the date/time of creation. The MDATE indicates the most recent date/time of modification, and the DDATE is the date/time of deletion. The use of these three time stamps helps to prevent data loss.

The XML file has two main sections: the header and the body. The header is located at the beginning of the XML file. An example of the XML file header is as follows:

```
<RH Version="4.0"><CustomerInfo>
<CustomerID>43</CustomerID>
<WGUID>{74039930-1011-4E8C-855D-9157F0527049}</WGUID>
<MacAddress>00:0E:35:CE:94:F3</MacAddress>
<RKey>179465209K</RKey>
<AnimalCount>413</AnimalCount>
<Events>5326</Events>
</CustomerInfo>
```

As can be seen, the header indicates a number of customer specific or local computer 102 specific pieced of information, namely, the version of the local component of the system 100, an internally generated customer ID number the 32-character alpha numeric password, the MAC address of the computer which generates the XML file, the key, the animal count, and the number of events that have taken place. This data allows the remote computer 112 to perform the necessary checks on the account of the user who is transmitting the XML file.

The body comprises the remainder of the XML file and can be further subdivided into several subcomponents, namely, an animal section(s) and an event type section. The animal section(s) contain information regarding each animal contained within the local computer 102 or remote computer 112, and the event type section details the specific events that can occur in the animal's life.

Turning to the animal section(s) of the body of the XML file, an example of the nested format is as follows:

```
<Animals>
    <Animal_ID>1</Animal_ID>
        <Species_Details>
            <Breed_Details>
        <Events>
```

-continued

```
            <Event_ID>1</Event_ID>
            . . .
        <Contact>
            <Contact_ID>1</Contact_ID>
            . . .
        <Locations>
            <Location_ID>1</Locaiton_ID>
            . . .
    <Animal_ID>1</Animal_ID>
    <STATUS>N</STATUS>
    <Animal_ID>2</Animal_ID>
        <Species_Details>
            <Breed_Details>
        <Events>
            <Event_ID>1</Event_ID>
            . . .
        <Contact>
            <Contact_ID>1</Contact_ID>
            . . .
        <Locations>
            <Location_ID>1</Location_ID>
            . . .
    <Animal_ID>2</Animal_ID>
    . . .
</Animals>
```

The first subsection relates to animals' species and breed. Details regarding the species, such as bovine, and breed, such as heifer, including GUIDs, are stored. All of the data contained in the animal section(s) is discuss in further detail in section B below. An example of the species and breed subsections are as follows:

```
<Species_Details>
<Species_ID>3</Species_ID>
<SpeciesType>Bovine</SpeciesType>
<Species_GUID>{6FB40A72-85C4-F5D392FE}</Species_GUID>
<Breed_Details>
    <Breed_ID>1</Breed_ID>
    <BovineType>3<BovineType>
    <CDATE>2006-03-14 17:31:38</CDATE>
    <MDATE>2006-03-14 17:31:38</MDATE>
    <DDATE>2006-03-14 17:31:38</DDATE>
    <Breed_GUID>{C1154BE3-4F1C-45E7-8585-
        CDD8C80FC3EC}</Breed_GUID>
    <BreedName>Angus</BreedName>
    <BirthWeight>0</BirthWeight>
    <BirthWeightAcc>0</BirthWeightAcc>
    <WeaningWeight>0</WeaningWeight>
    <WeaningWeightAcc>0</WeaningWeightAcc>
    <YearlingWeight>0</YearlingWeight>
    <YearlingWeightAcc>0</YearlingWeightAcc>
    <TotalMaternal>0</TotalMaternal>
    <Milk>0</Milk>
    <MilkAcc>0</MilkAcc>
    <ScrotalCircumference>0</ScrotalCircumference>
    <ScrotalCircumferenceAcc>0</ScrotalCircumferenceAcc>
    <TreeDepth>0</TreeDepth>
    <CDATE>2005-11-15 18:35:00</CDATE>
    <MDATE>2005-11-15 18:35:00</MDATE>
    <DDATE>2005-11-15 18:35:00</DDATE>
    <Ranch_ID>0</Ranch_ID>
    <Comments></Comments>
    <BirthHeight>0</BirthHeight>
    <BirthPremise_ID>1</BirthPremise_ID>
    <BirthType_ID>0</BirthType_ID>
    <BirthVigor_ID>0</BirthVigor_ID>
    <BirthPerformedBy_ID>0</BirthPerformedBy_ID>
    <Tattoo></Tattoo>
    <Brand></Brand>
    <Color></Color>
    <RanchID>1</RanchID>
    <Grafted>false</Grafted>
```

-continued

```
    <Weaned>false</Weaned>
    <Raised>true</Raised>
    <Breeder_ID>0</Breeder_ID>
    <Owner_ID>0</Owner_ID>
    <Comment></Comment>
    <Picture></Picture>
        </Breed_Details>
    <Species_Details>
<STATUS>N</STATUS>
```

In the event subsection, the events that have happened for each animal are described. This subsection details the time, place, etc. of events, which were created and stored in the event table, as shown above. Maintaining the list of events allows the animal's life to be monitored in great detail from birth to death. An example of the events subsection is as follows:

```
<Events>
    <Event_ID>1</Event_ID>
        <Event_GUID>{15CB5133-7AE3-403E-A4C1-
            36EF20651AAF}</Event_GUID>
        <Event_Batch>1</Event_Batch>
        <CDATE>2006-03-14 17:31:38</CDATE>
        <MDATE>2006-03-14 17:31:38</MDATE>
        <DDATE>2006-03-14 17:31:38</DDATE>
        <EventDate>2006-03-14 17:31:38</EventDate>
        <EventType_ID>9</EventType_ID>
        <Animal_ID>1</Animal_ID>
        <PremiseID>1</PremiseID>
        <RanchHand>0</RanchHand>
        <Events_Description>2006-03-14
            17:31:38</Events_Description>
        <Comments></Comments>
        <FTABLE>Bovine</FTABLE>
        <FKID>1</FKID>
        <Ranch_ID>1</Ranch_ID>
    <Event_ID>1</Event_ID>
    <STATUS>N</STATUS>
    . . .
</Events>
```

In the contact subsection, the list of owner contact information associated with each animal is described. Maintaining the contact information list allows the animal's ownership to be tracked from birth to death. An example of the contact subsection is as follows:

```
<Contacts>
    <Contact_ID>1</Contact_ID>
        <Contact_GUID>{52C1001B-7568-4E17-BEC6-
            57C8570E50AF}</Contact_GUID>
        <CDATE>2006-03-14 17:30:11</CDATE>
        <MDATE>2006-03-14 17:30:11</MDATE>
        <DDATE>2006-03-14 17:30:11</DDATE>
        <FirstName>John</FirstName>
        <MiddleName></MiddleName>
        <LastName>Patti</LastName>
        <Ranch_ID>1</Ranch_ID>
        <ContactRole>0</ContactRole>
        <Email></Email>
        <Cell></Cell>
        <Breeder>true</Breeder>
        <Owner>true</Owner>
        <Seller>true</Seller>
        <Customer>false</Customer>
        <Vendor>false</Vendor>
        <ServiceProvider>false</ServiceProvider>
        <Vet>false</Vet>
```

-continued

```
        <Employee>true</Employee>
        <HomePhone></HomePhone>
        <OfficePhone></OfficePhone>
        <FaxPhone></FaxPhone>
        <PriStreetAddress>901 Main St, Ste 7100</PriStreetAddress>
        <PriCity>Dallas<PriCity>
        <PriState>TX</PriState>
        <PriZip>75202</PriZip>
        <SecStreetAddress></SecStreetAddress>
        <SecCity></SecCity>
        <SecState></SecState>
        <SecZip></SecZip>
        <Website></Website>
    <Contact_ID>1</Contact_ID>
    <STATUS>N</STATUS>
    . . .
</Contacts>
```

In the location subsection, the list of locations or premises where the animal has been located throughout its life is described. Maintaining the location information list allows the animal's location from birth to death to be tracked to maintain compliance with the NAIS. An example of the location subsection is as follows:

```
<Locations>
    <Location_ID>1</Location_ID>
        <Location_GUID>{56DB4AA8-8457-4489-9F89-
            6FB71FAF0BED}</Location_GUID>
        <LocationName>Barn</LocationName>
        <LocationDesc>Barn</LocationDesc>
        <Ranch_ID>1</Ranch_ID>
        <CDATE>2006-03-14 17:30:11</CDATE>
        <MDATE>2006-03-14 17:30:11</MDATE>
        <DDATE>2006-03-14 17:30:11</DDATE>
        <Comments>Created at startup.</Comments>
    <Location_ID>1</Location_ID>
    <STATUS>N</STATUS>
    . . .
</Locations>
```

Now turning to the event type section of the body, an example is as follows:

```
<Events>
    <Event_ID>1<Event_ID>
        <EventType_ID>1<EventType_ID>
        <EventType_GUID>{EF5FB5AF-FEE6-4185-82A7-
        05E63AAA6EED}</EventType_GUID>
        <CDATE>2005-11-15 18:34:33</CDATE>
        <MDATE>2005-11-15 18:34:33</MDATE>
        <DDATE>2005-11-15 18:34:33</DDATE>
    <STATUS>N</STATUS>
    . . .
</Events>
```

The Events section contains the user created events. The data contained within the event section correlates to the events table described above, where the user is able to generate different events that can happen in the life of an animal. Each time synchronization occurs, these events are transmitted with the XML file so that the most recent table of events is maintained.

Now turning back to FIG. 3, if desired, new data can be entered into the system 100 in step 332. Specifically, a determination is made by the user if new data is to be entered in step 332, and if the user desires to enter data, then data is entered in step 334. Otherwise, operation of the system is terminated.

B. Managing Animal Information

Referring to FIGS. 4-15 of the drawings, reference numerals 400-1500 generally depict different menus that a user can access that show the fields available in the local DB 114 (and in the remote DB 122), which include the NAIS required fields. Specifically, located at the top of each menu are some of the NAIS required fields, namely, animal identification and location identification fields. The fields that can be associated with the animal identification are the EID field 402, Visual Identification Number (VID) field 403, registration number field 404, and other identification field 406. The field associated with the location is the location field 408.

Each of the EID field 402, VID field 403, registration number field 406, and other identification field 406 can be individually or alternatively associated with an NAIS-compliant identifier. Specifically, the remote DB 122 can cross reference any combination of these fields with an NAIS compliant identifier so that the movements and/or health of the animal associated with a particular identifier can be easily tracked.

With respect to the location field 408, users typically do not remember the different PIDs that have been assigned to different locations where animals are stored or reside. As shown in FIGS. 4-15, "North Field" is the information contained within the location identifier. Location field 408, thus, allows the user to enter a location of an animal on either a specific premise, a ranch, or other location with a PID.

Also included with menus 400-1500 are other fields containing animal information, which may not be necessary for NAIS compliance but may instead be useful to the user. Generally, these fields contain physical characteristics for a given animal. Specifically, in the example depicted in FIGS. 4-15, an animal type field 410, a birth date field 412, a last weight field 414, a current age field 416, and an Average Daily Gain (ADG) field 418 are located at the top of menus 400-1500. Other fields, such as sex, can also be included.

Figure 4:
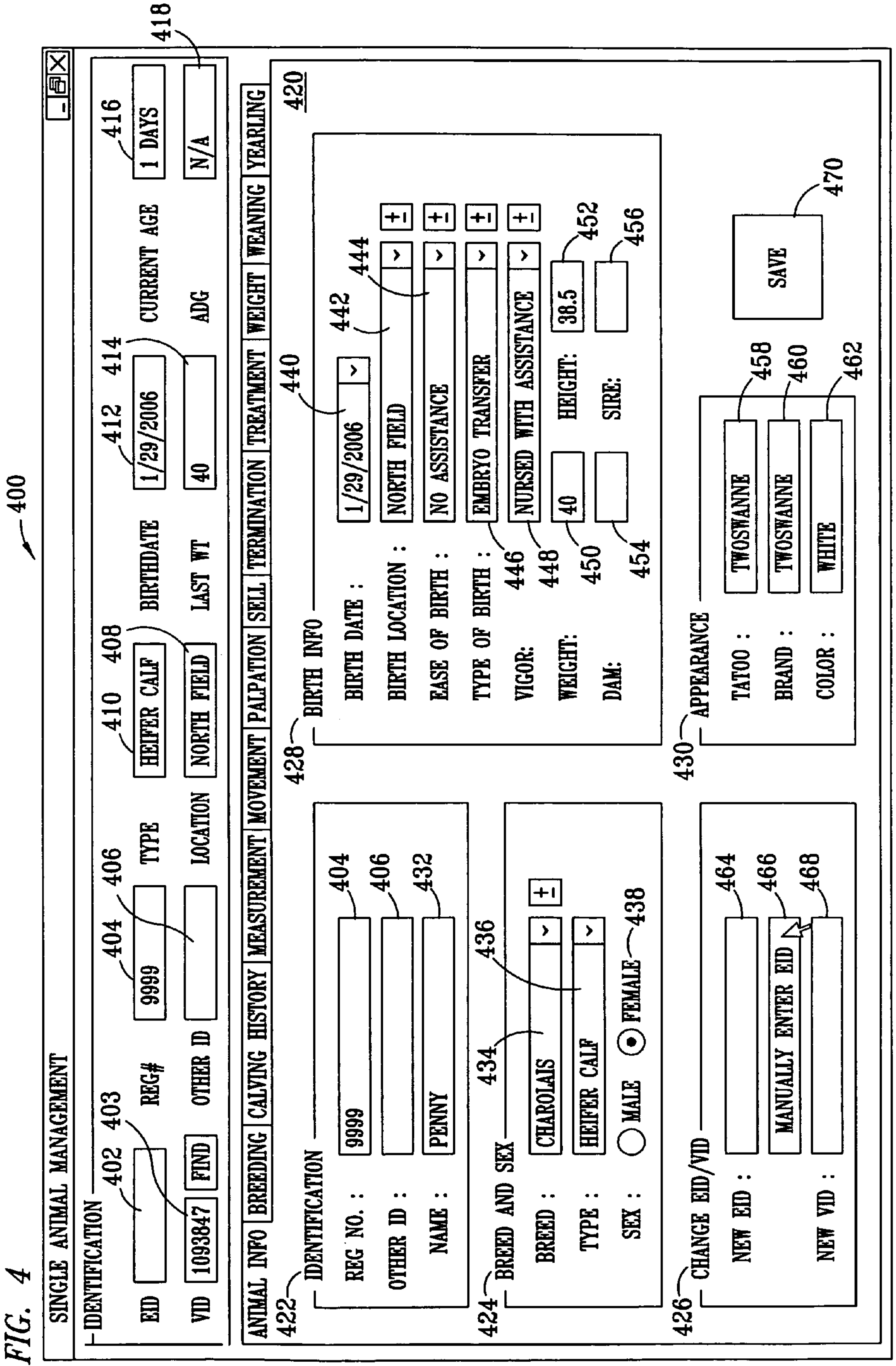
FIG. 4 is a menu depicting entry of animal information into the system.
Figure 16:
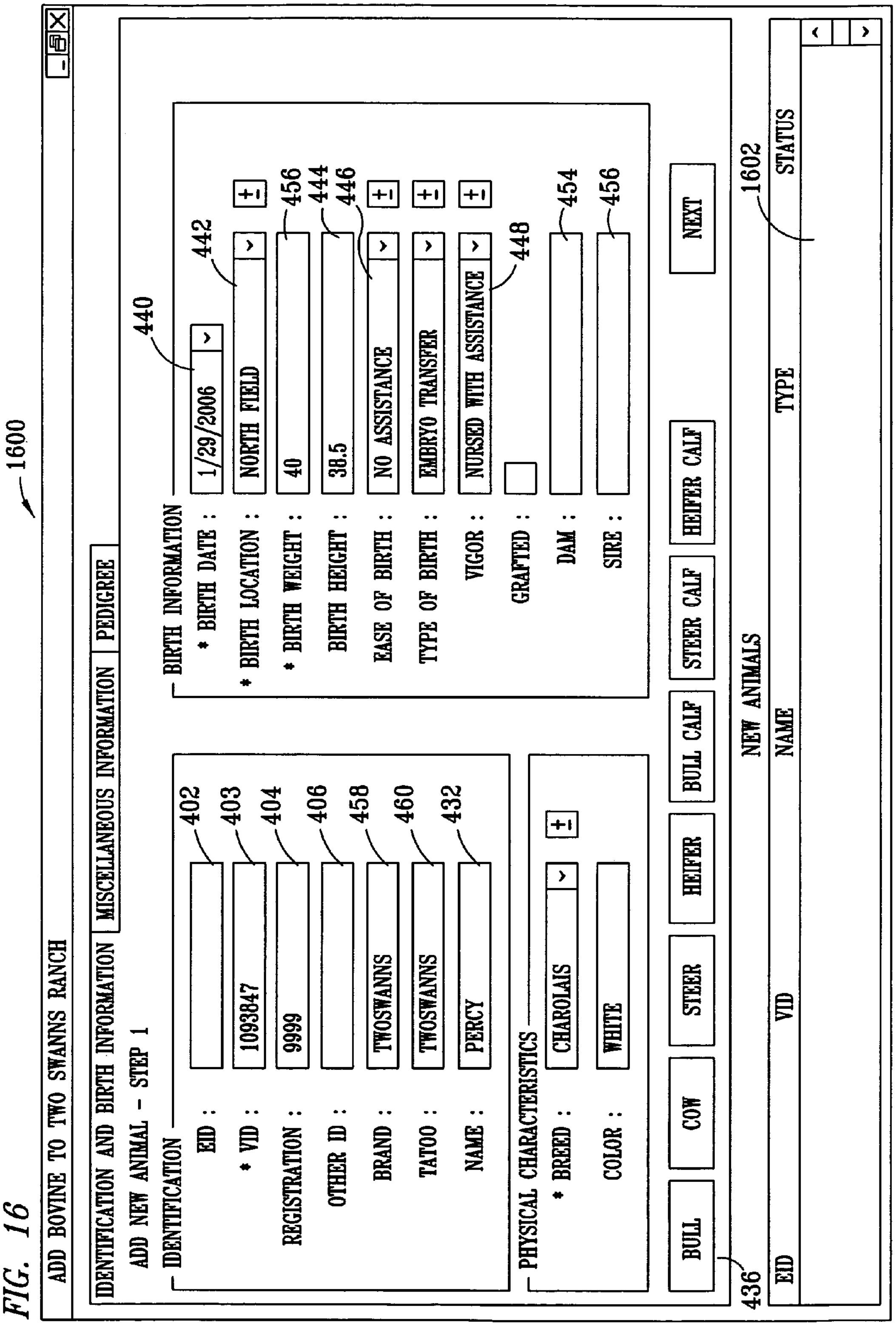
FIG. 16 is a menu for adding identification and birth information for an additional animal.

Turning to FIG. 4, menu 400 generally depicts a general animal information menu. This menu is chosen when the user selects the animal info tab 420. Additionally, as shown in FIG. 16, information for a new animal corresponding to the data contained in menu 400 can be entered in menu 1600. However, menu 1600 also includes an array 1602 that contains a list of animals contained in local DB 114 and/or remote DB 122.

A variety of pieces of information that are associated with a specific animal are entered and/or modified on menu 400. As shown, menu 400 is composed of five blocks that each have one or more changeable fields: identification block 422, breed and sex block 424, change EID/VID block 426, birth info block 428, and appearance block 430.

Generally, information contained within the identification block 422 includes easily changeable reference information. As can be seen in FIG. 4, the identification block 422 includes a changeable registration number field 404, a changeable other identification field 406, and a name field 432.

The breed and sex block 424 includes information regarding the animal's breed and gender. Knowledge regarding these specific characteristics allow for both categorizing as well as determining genetic predispositions. Block 424 includes a breed field 434, type field 436, and a sex indicator 438. The breed field 434 employs a pull-down menu for the user to select a specific breed from a particular list so as to avoid errors in referencing the correct breed. An example of a breed is Charolais, which is a breed of cattle. The type field 436 also includes a pull-down menu and allows the user to choose specific type, such as a heifer calf. Finally, the sex indicator 438 allows the user to select the animal's gender.

The birth info block 428 allows the user to track birthing characteristics of a particular animal. Block 428 includes a birth date field 440, a birth location field 442, an ease of birth field 444, a type of birth field 446, a vigor field 448, a weight field 450, a height field 452, a dam field 454, and a sire field 456. The birth date field 440 has a pull-down menu, which allows the user to select a day of birth of an animal. The birth location field 442, which is also chosen from a pull-down menu, allows the user to select an area having an associated PID from a list that is more easily remembered than a PID number. Additionally, ease of birth field 444, which is also chosen from a pull-down menu, describes the type of assistance needed during the animal's birth, for example "no assistance." The type of birth field 446 indicates the method of conception or the technique for carrying the animal to term, which is chosen from a pull-down menu. For example, as shown in menu 400, the type of birth field indicates an "embryo transfer." The vigor field 448 is chosen from a pull-down menu and indicates the animal's condition or vigor during its early development, for example menu 400 indicates "nursed with assistance." The weight field 450 and height field 452 maintain the current height and weight of the animal in whatever units that the user chooses, such as pounds and feet/inches. Finally, the dam field 454 and a sire field 456 indicate the mother and father, respectively, and can reference a number of indicators associated with the animal's dam and sire.

The appearance block 430 includes a variety of other physical characteristics of the animal. As shown, block 430 has a tattoo field 458, a brand field 460, and a color field 462. The tattoo field 458 includes a description of an identification tattoo located on the body of the animal. The brand field 460 includes a description of a brand located on the body of the animal, and the color field 462 includes a description of the color of the animal, such as spotted or white.

Finally, in the unusual circumstances, such as the destruction or loss of an animal's EID tag, the change EID/VID block 426 allows the user to change the EID or VID of the animal. It is currently believed that in the event of such loss or destruction, a new EID would be assigned to the animal (as opposed to creating a new tag with the same EID) with proper documentation of the loss or destruction of the tag. Because EID number is needed for compliance with the NAIS and a change in an animal's EID would be the exception rather than the norm, an ability to change this number should include a protective measure to prevent inadvertent changes. Therefore, the new EID field 464 has a button 466 associated with it that must be activated to allow the user to manually enter in a new EID. The new VID field 468, on the other hand, allows the user to enter in another VID.

Once all of the changes have been made, the system 100 does not necessarily automatically save the entered information. The user, to save these changes, should activate the save button 470. By activating the save button 470, the user-made changes are reflected in the local DB 114.

Figure 5:
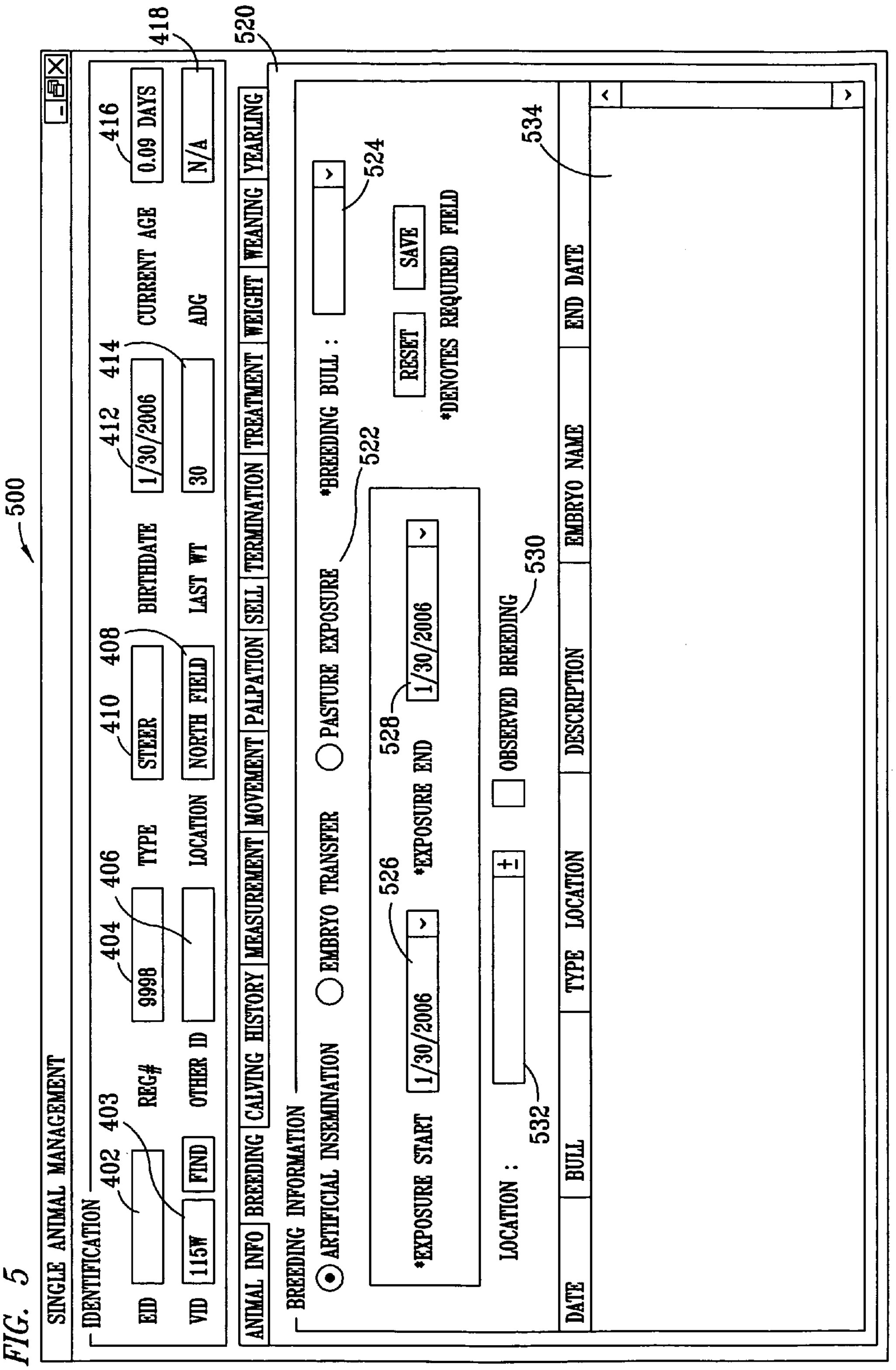
FIG. 5 is a menu depicting entry of breeding information into the system.

Turning to FIG. 5, menu 500 generally depicts an animal breeding information menu. Menu 500 is chosen when the user selects the breeding tab 520. Typically, menu 500 is used to cross-reference or otherwise determine or track offspring of the selected animal. Specifically, the menu depicted in FIG. 5 shows breeding for a female, but if a male's information is accessed, the format would change. However, the information for a male would indicate the females which the male has bred with, and similar information to what is seen in FIG. 5 is accessed.

Two key pieces of information that are helpful in livestock management are the type of breeding and the breeding bull. The type of breeding is reflected in field 522, which is a selector button that allows the user to select between artificial insemination, embryo transfer, and pasture exposure. In each case the bull or father is indicated in field 524, in which the bull is selected from a pull-down menu. Both artificial insemination and embryonic transfer are invasive techniques in which the user can precisely document the events. However, during pasture exposure, precise details about conception may not be available. Thus, if conception occurs during pasture exposure, the exposure end and beginning dates are reflected in fields 526 and 528, which are each selected from pull-down menus. In cases where breeding was directly observed, the user can check the box marked observed breeding 530. Additionally, the breeding location can be stored in field 532.

In addition to entering information regarding a specific breeding event, information regarding offspring and other breeding events can also be entered and stored. Specifically, array 534 is included. Array 534 allows the dates of conception, the bull, the type, description, embryo name, and end date (birth date or miscarriage date). Thus, the user is able to easily access the data for breeding events of a given animal by selecting the breeding tab 520.

Figure 6:
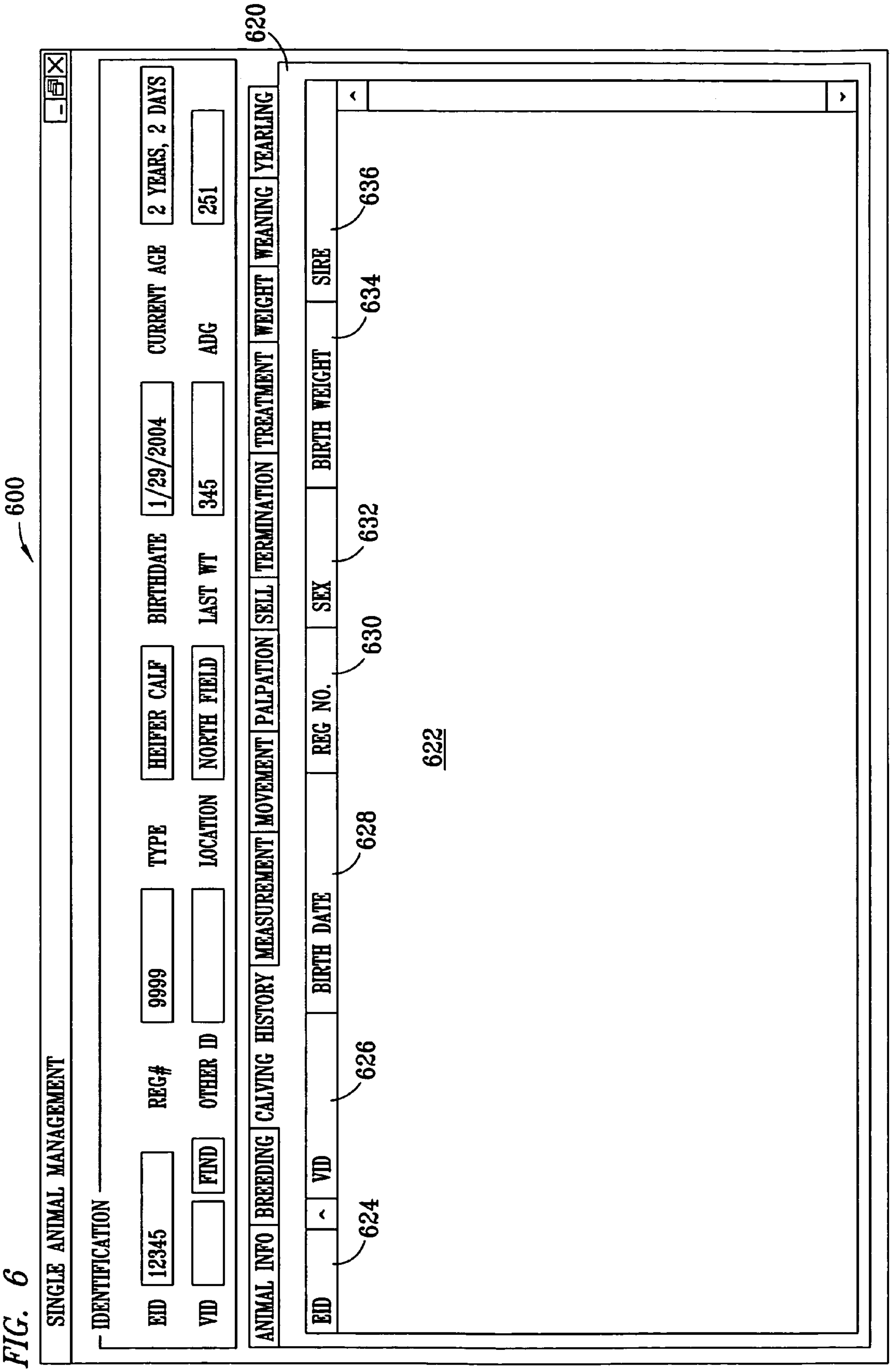
FIG. 6 is a menu depicting entry of calving history into the system.

Turning to FIG. 6, menu 600 generally depicts an offspring or calving menu. This menu is chosen when the user selects the calving history tab 620. Specifically, tab 620 includes an array 622 that indicates the offspring of a given animal. The array 622 has an EID field 624, a VID field 626, a birth date field 628, a registration number field 630, a sex field 632, a birth weight field 634, and a sire field 636. Thus, the data for the offspring of a given animal can be easily determined and/or cross-referenced.

Figure 7:
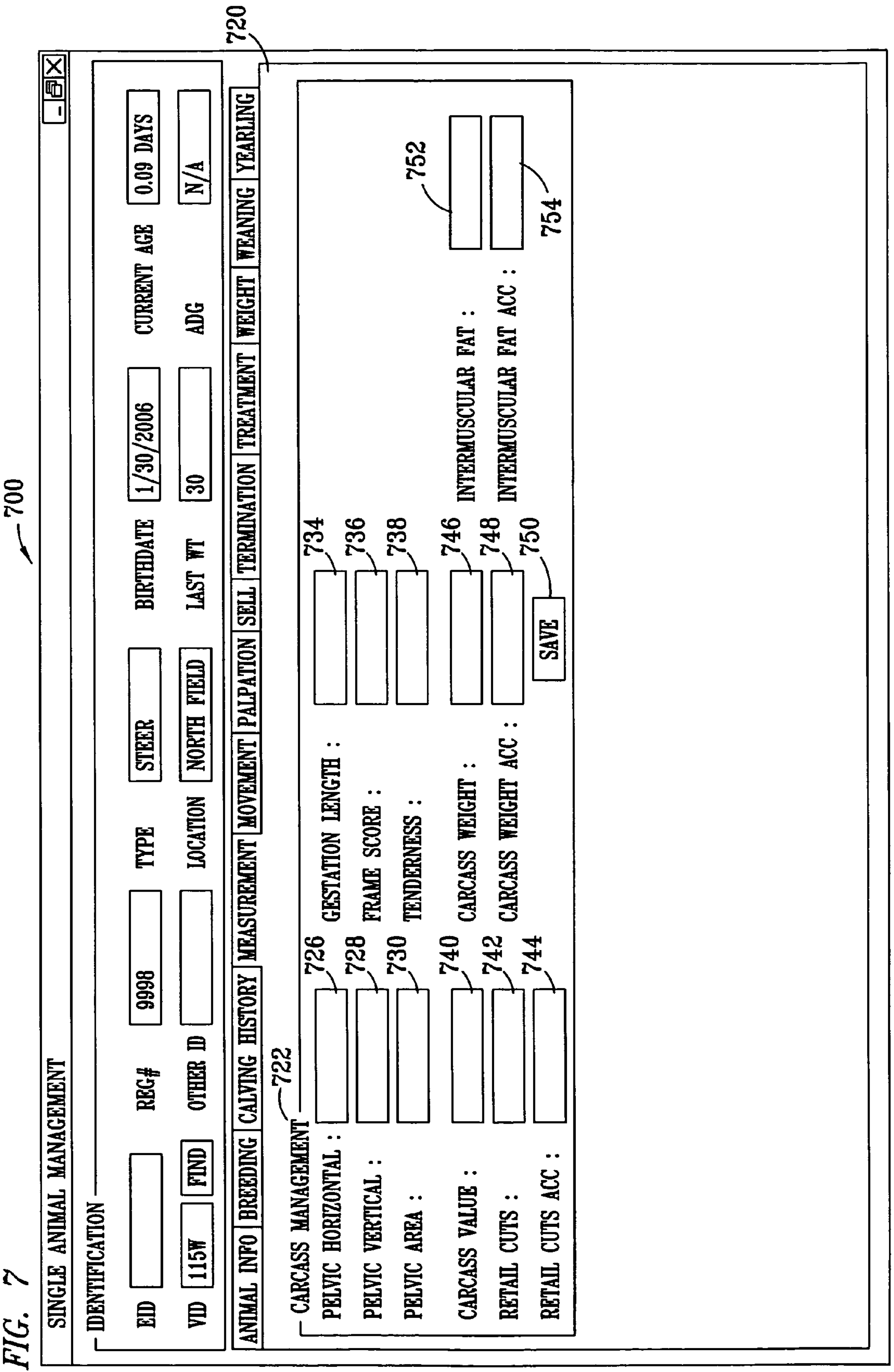
FIG. 7 is a menu depicting entry of carcass measurements into the system.

Turning to FIG. 7, menu 700 generally depicts a physical measurements menu. This menu is chosen when the user selects the measurement tab 720. Specifically, the tab 720 includes a carcass measurement block 722.

Once the animal has been slaughtered, measurements associated with the carcass may help indicate potential problems in a specific line of animals or within the process of growing the livestock. In other words, carcass data from a variety of slaughtered animals can help improve the overall yield of livestock crops. Within block 722 are a variety of physical measurements that can be added and stored in the local DB 114 and/or the remote DB 122, which are reflected by different fields. Specifically, the fields utilized in the carcass measurement block are the carcass pelvic horizontal field 726, the pelvic vertical field 728, the pelvic area field 730, the gestation length field 734, the frame score field 736, the tenderness field 738, the carcass value field 740, the retail cuts field 742, the retail cuts acc field 744, the carcass weight field 746, the carcass weight acc field 748, the intermuscular fat field 752, and the intermuscular fat acc field 754. Each of these measurements is common when measuring the carcass of a slaughtered animal. Additionally, all information can be saved by activating the save button 750.

Figure 8:
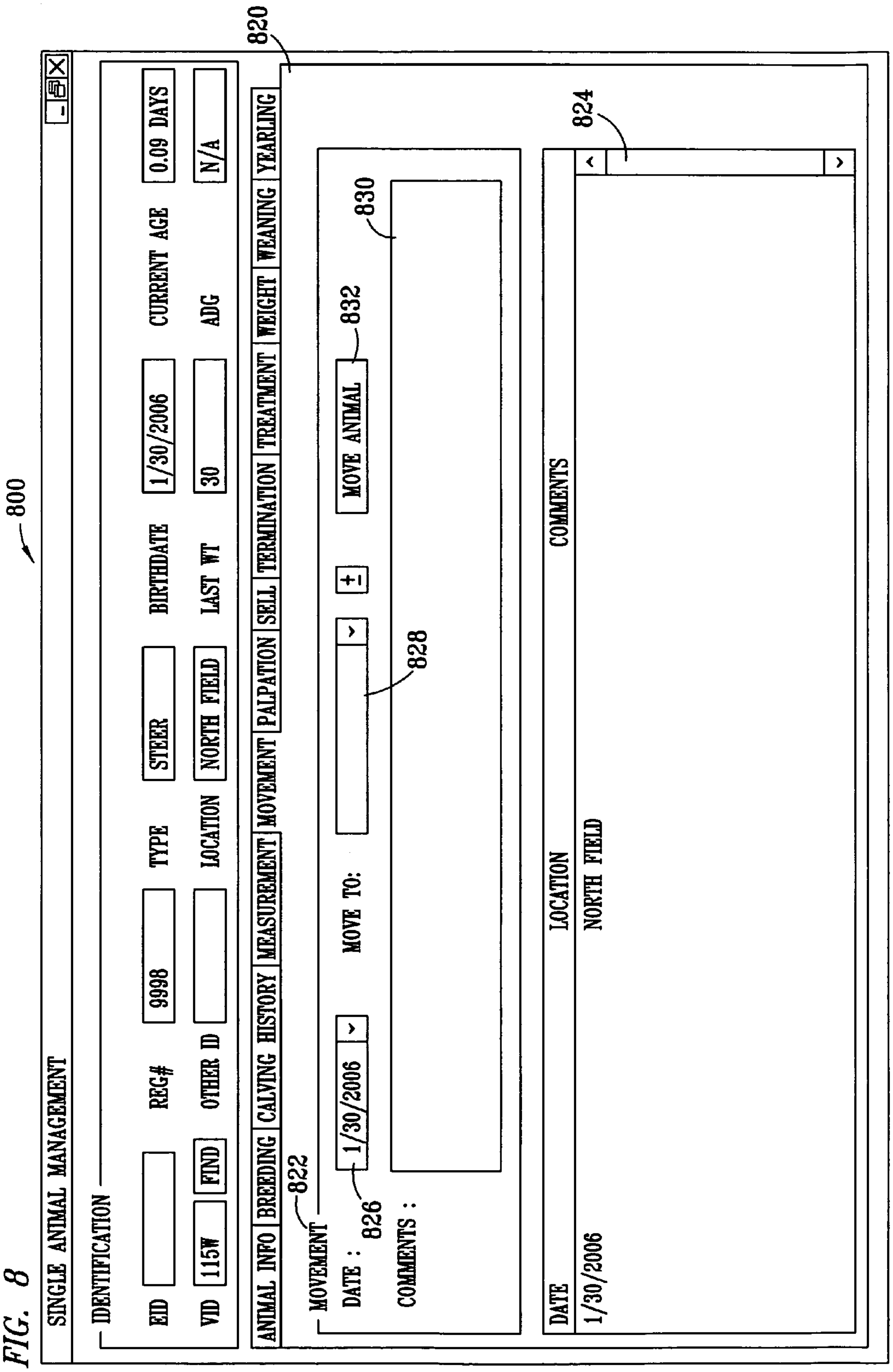
FIG. 8 is a menu depicting entry of movement information into the system.

Turning to FIG. 8, menu 800 generally depicts and maintains animal location information. This menu is chosen when the user selects the movement tab 820. For a rancher, farmer, or livestock manager to be compliant with the NAIS, animal movements between different specified locations must be maintained. Movements of a given animal can be monitored and or modified through the use of tab 820. Specifically, tab 820 includes a movement block 822 and a movement history array 824.

When an animal is moved from one location to another the user can simple enter the new location into the system 100. Entry of data into the system 100 is accomplished through entering the movement date in date field 826, which is chosen from a pull-down menu. The location, which is the simple name associated with a registered PID or section of an area within a registered PID, is in a field 828, which is chosen from a pull-down menu. In addition to selecting the date of movement and the location of movement to, the user can enter in a comment in field 830. Once the data is entered into block 822, the user can save the information by activating the move animal button 832.

Upon entry of information in block 822, changes in animal movement are reflected in the array 824. The global changes in movement of a particular animal can be easily seen in array 824. As an example, which is shown in FIG. 8, the date of movement for a particular animal is Jan. 30, 2006 and the location of movement of the animal is North Field. This specific data can be stored in local DB 114 and/or the remote DB 122 for future delivery to the NAIS, thus, allowing the user to be compliant with the NAIS.

Figure 9:
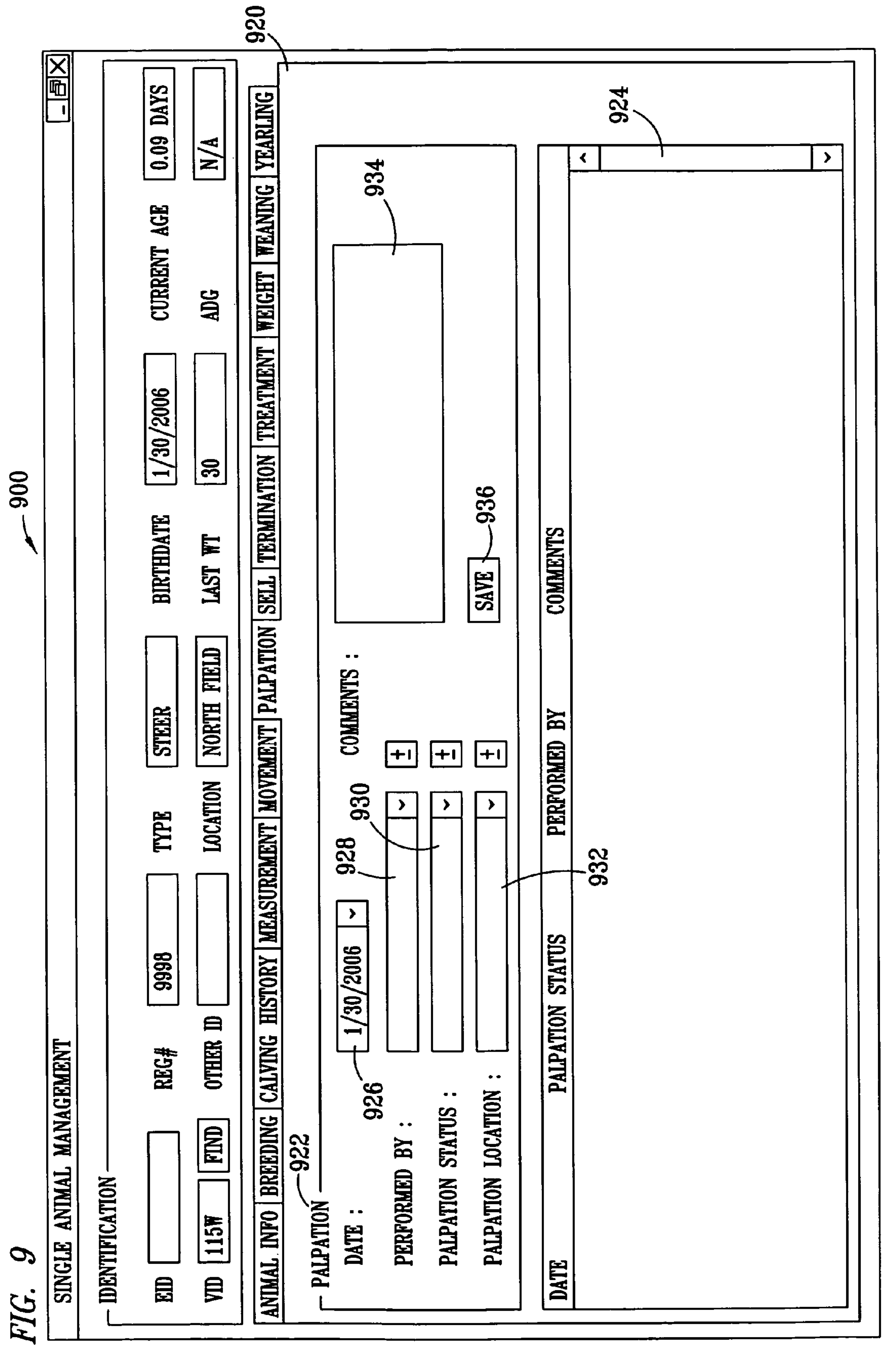
FIG. 9 is a menu depicting entry of palpation information into the system.

Turning to FIG. 9, menu 900 generally depicts a palpation menu. This menu is chosen when the user selects the palpation tab 920. In addition to physical locations and physical characteristics of an animal, the medical information can also be important. In particular, menu 900 allows a user to document palpation. Specifically, menu 900 includes a palpation block 922 and an array 924.

When palpation occurs, the user can precisely document the procedure. In particular the user can document the date in date field 926, who performed the palpation in the performed by field 928, the status in the palpation status field 930, and the location in the palpation location field 932. In addition to all of this information, a user can include any desired comments in the comment field 934. Once all of the desired data is entered into block 922, the user can save the information to array 924.

Array 924 allows for information regarding an animal's palpations to be recorded so as to monitor the health and any changes therein. These palpations can be stored in the local DB 114 and/or the remote DB 122.

Figure 10:
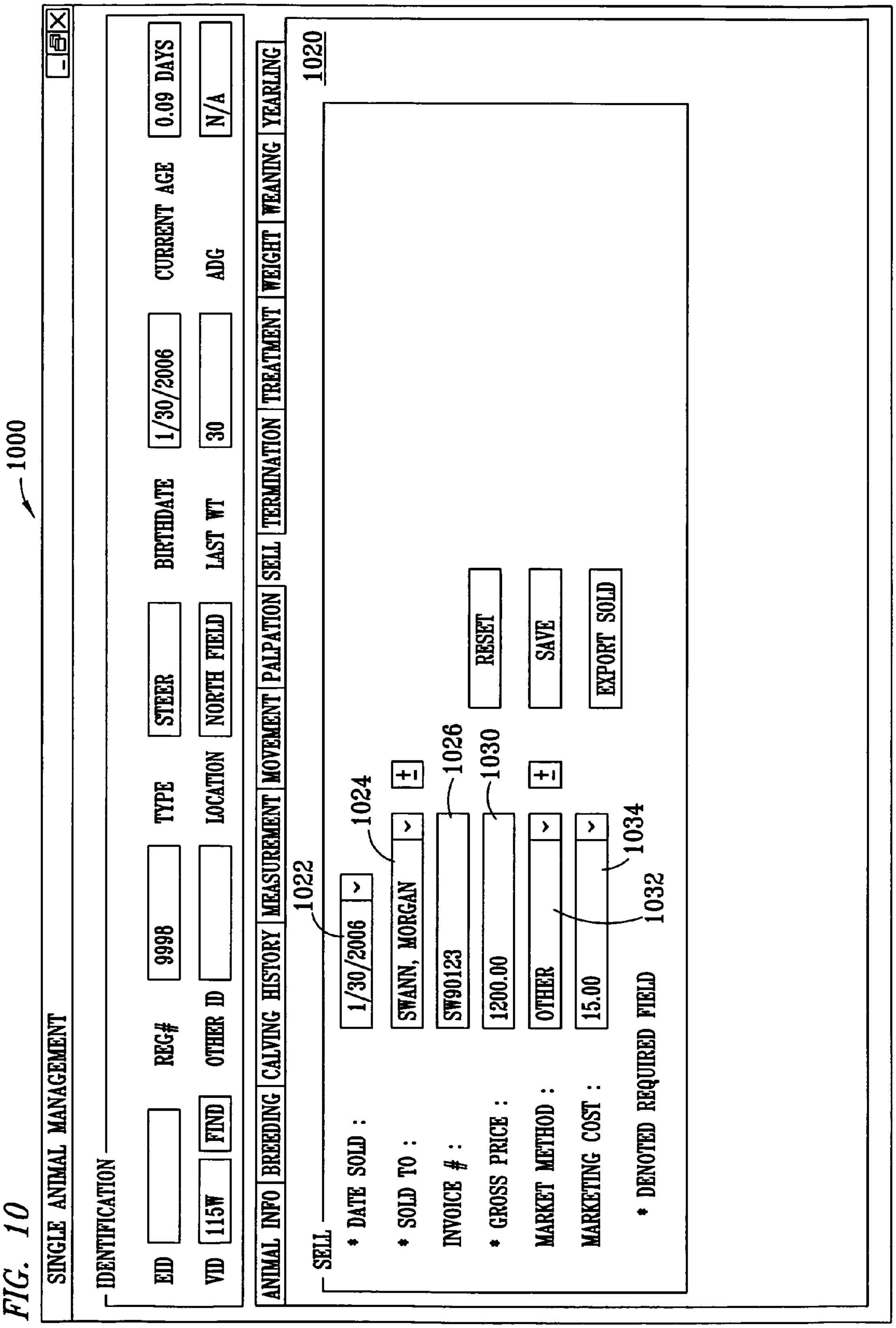
FIG. 10 is a menu depicting entry of sales information into the system.

Turning to FIG. 10, menu 1000 generally depicts a sales menu. This menu is chosen when the user selects the sell tab 1020. Specifically, menu 1000 allows the user to document the sale of a particular animal. Within menu 1000, the user can enter the date of sale in the date sold field 1022, the party to whom the animal was sold in the sold to field 1024, the invoice in the invoice number field 1026, the gross price in the gross price field 1030, the marketing method (such as an auction) in the marketing method field 1032, and a marketing cost in the marketing cost field 1034.

Figure 11:
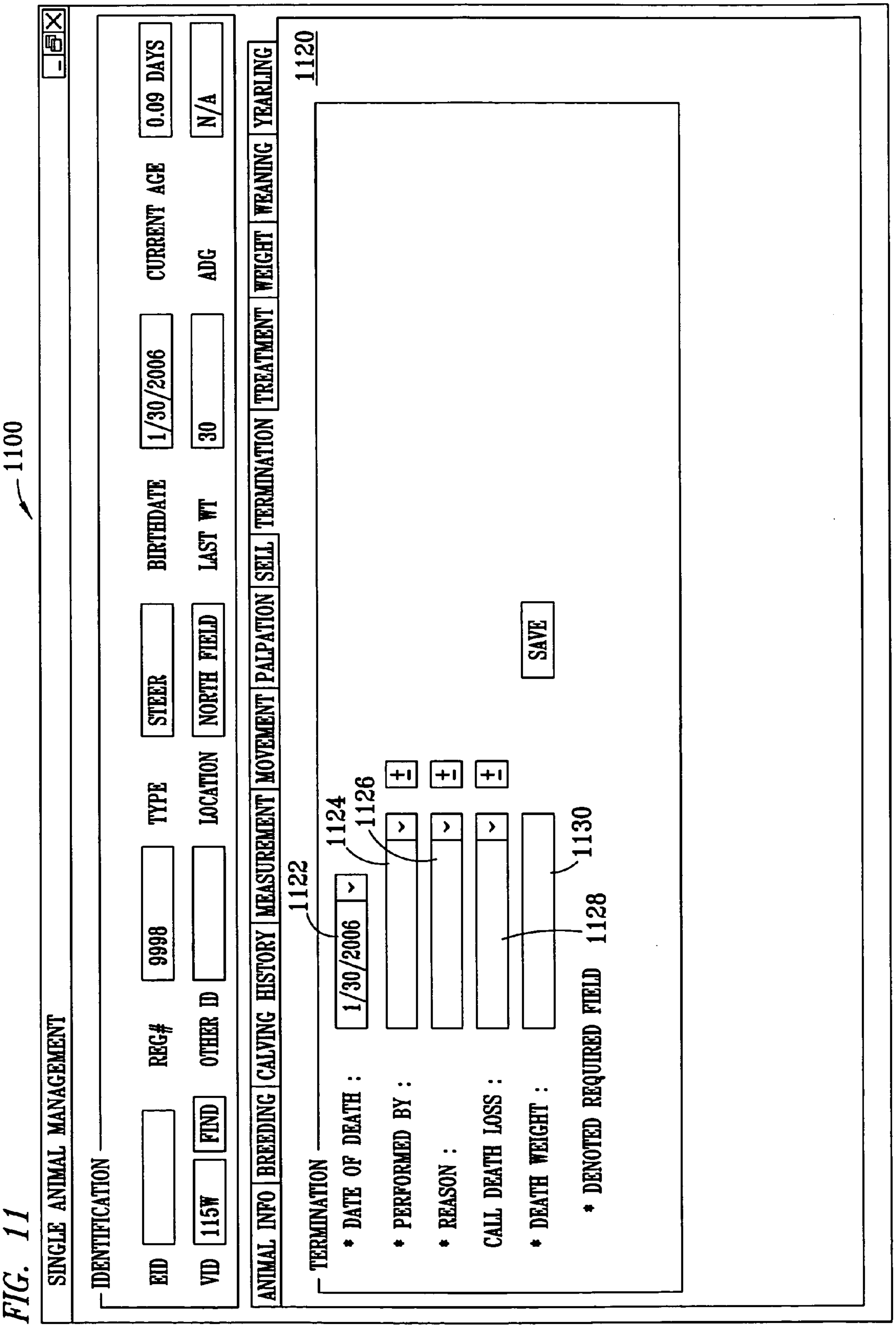
FIG. 11 is a menu depicting entry of termination information into the system.

Turning to FIG. 11, menu 1100 generally depicts a termination information menu. This menu is chosen when the user selects the termination tab 1120. Specifically, menu 1100 allows the user to document the termination data of an animal. Within menu 1100, the user can enter the termination date in the date of death field 1122, the person who slaughtered the animal in the "performed by" field 1124, the reason for the termination in the "reason" field 1126, the calf death loss in the calf death loss field 1128, and the death weight in the death weight field 1130.

Figure 12:
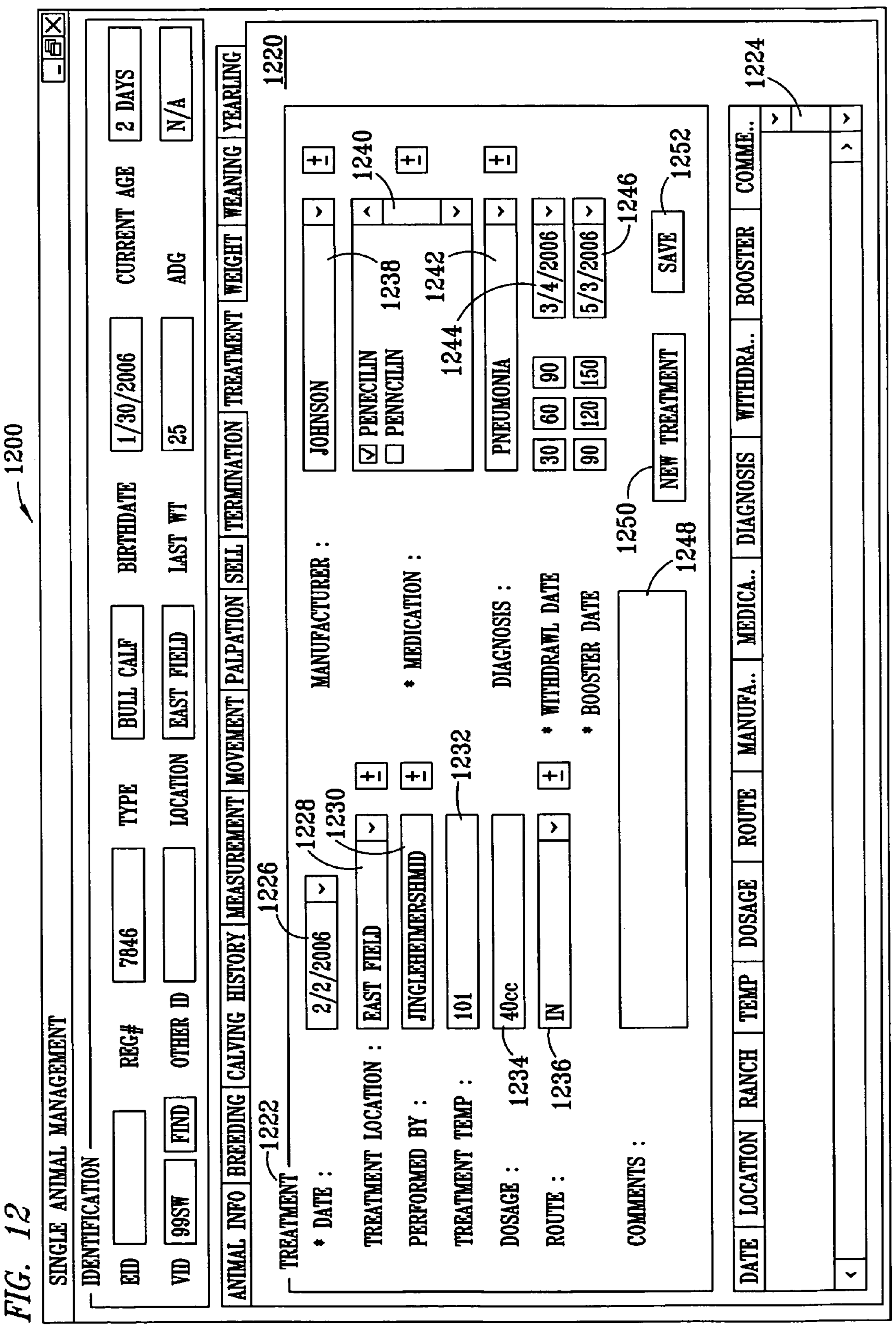
FIG. 12 is a menu depicting entry of medical treatment information into the system.

Turning to FIG. 12, menu 1200 generally depicts a treatment information menu. This menu is chosen when the user selects the treatment tab 1220. In addition to palpation, other detailed medical treatment information is also generally available on the system 100 through menu 1200. Menu 1200 includes a treatment block 1222 and a treatment array 1224.

Each time an animal is medically treated, the user can document the treatment by entering data into block 1222. Specifically, the user can enter the date of treatment in the date field 1226, the physical location of the treatment in the treatment location field 1228, the person who performed the treatment in the "performed by" field 1230, the temperature at the time of treatment in the treatment temperature field 1232, the dosage of the treatment in the dosage field 1234, the treatment route (such as oral or intravenous) in the route field 1236, the manufacturer of the treatment in the manufacturer field 1238, the treatment medication type in medication field 1240, diagnosis in the diagnosis field 1242, withdrawal date in the withdrawal date field 1244, and a booster in the booster date field 1246. Comments can also be entered by the user in the comment field 1248. Once entered, the user can save the information into array 1224 by activating the save button 1252 and can add a new treatment by activating the new treatment button 1250.

Figure 13:
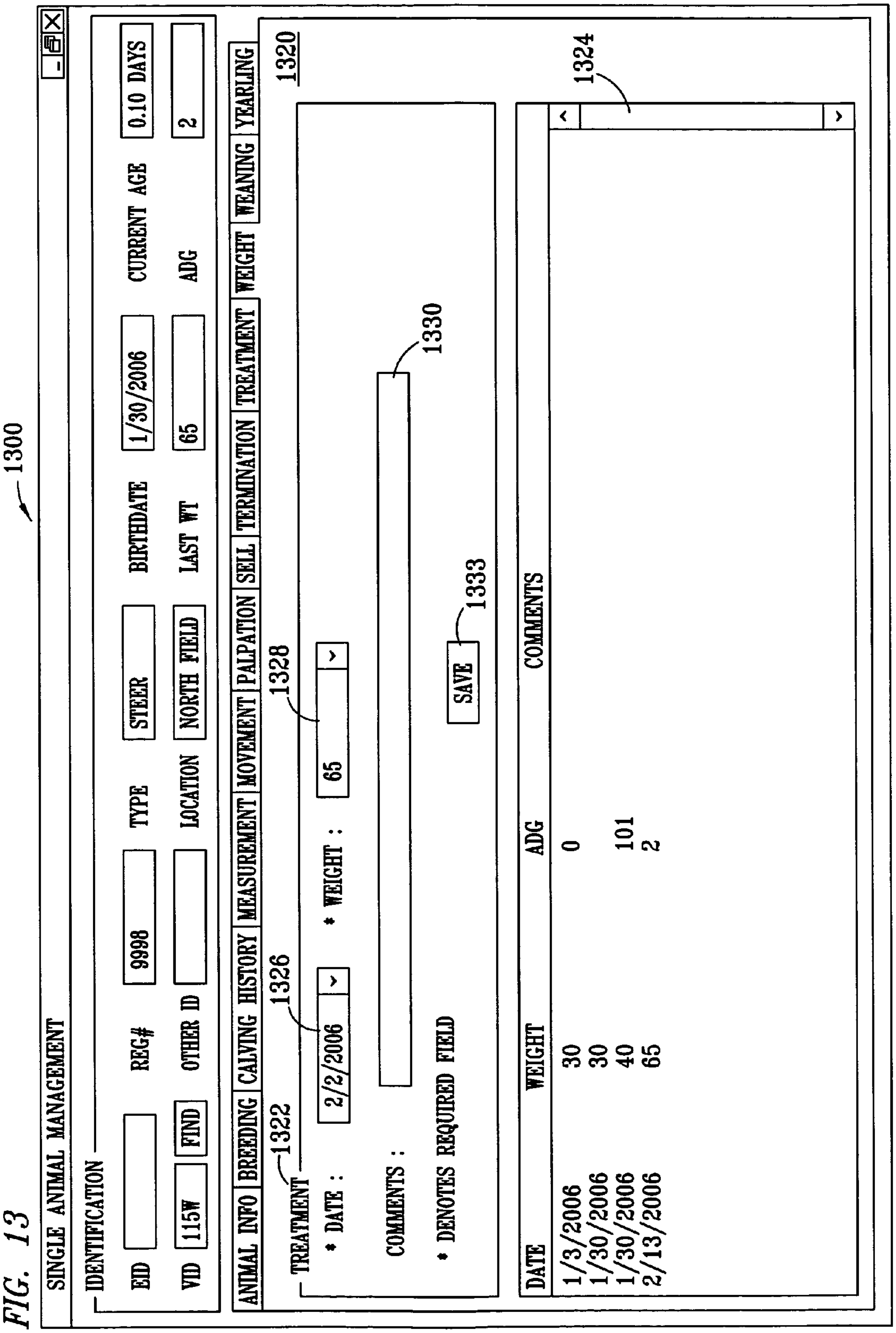
FIG. 13 is a menu depicting entry of weight information into the system.

Turning to FIG. 13, menu 1300 generally depicts a weight menu. This menu is chosen when the user selects the weight tab 1320. Over the lifetime of an animal the weight can vary quite drastically, and it can be an indicator of the type of meat (i.e. amount of marbling, etc.). Thus, the weight of the animal can be a very good indicator of the potential yield of a carcass.

When entering and monitoring the weight of an animal, the user employs weight block 1322 and array 1324. Block 1322 allows the user to enter period weight data by providing a date field 1326, a weight field 1328, and a comment field 1330. Once the data is entered into the fields of block 1322, the user can save the data to array 1324 by activating the save button 1333. Thus, the array 1324 allows the user to monitor animal weight as a function of time.

Figure 14:
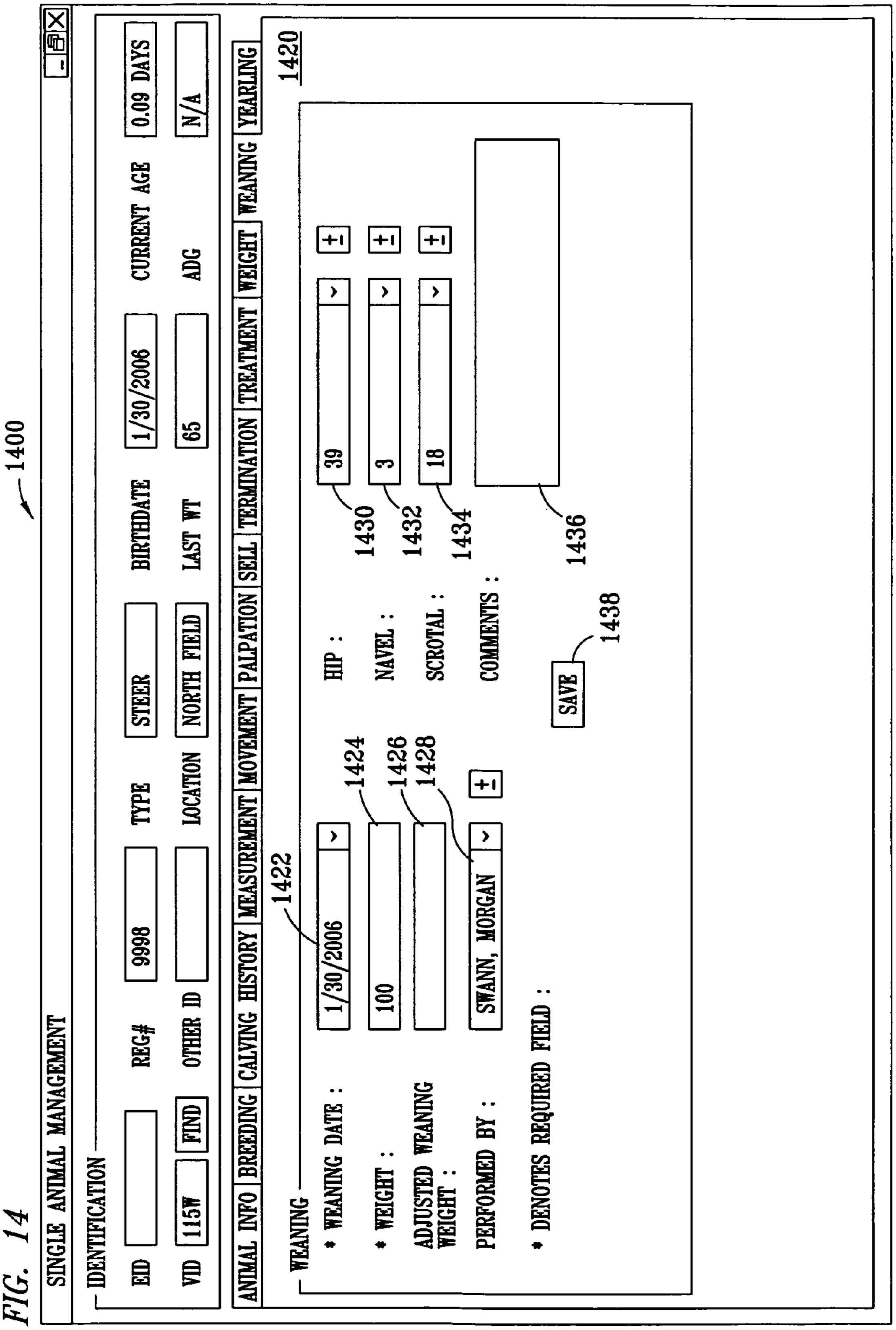
FIG. 14 is a menu depicting entry of weaning information into the system.
Figure 15:
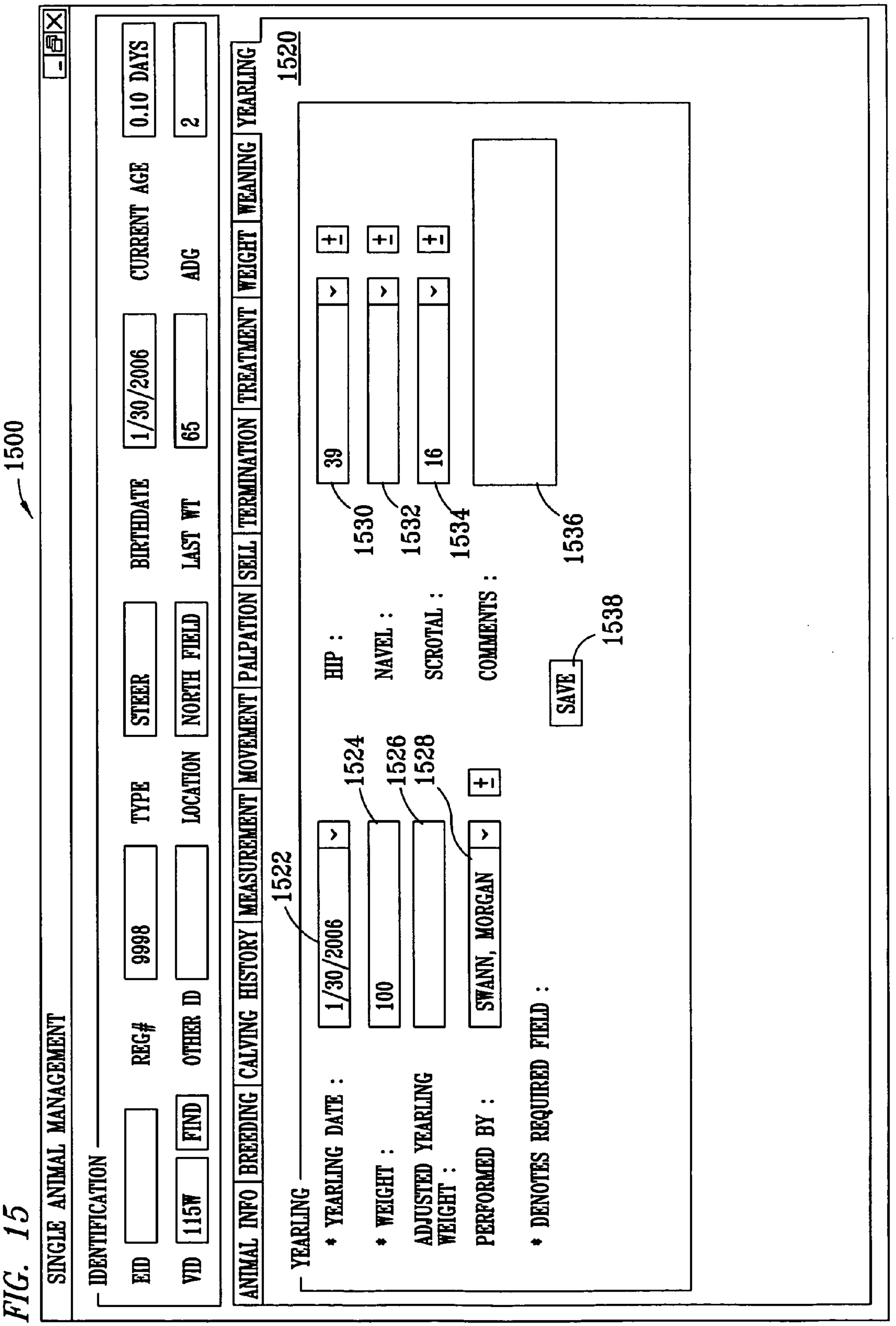
FIG. 15 is menu depicting entry of yearling information into the system.

Turning to FIGS. 14 and 15, menus 1400 and 1500 generally depict a weaning menu and a yearling menu, respectively. These menus are chosen when the user selects the weaning tab 1420 or yearling tab 1520, respectively. Each of these two menus allows for measurements at particular times during the development of an animal, namely at weaning and when it reaches its first birthday.

For each of the weaning menu 1400 and yearling menu 1500, the measurements taken are similar. Dates for each are recorded in date fields 1422 and 1522. Weight at each event are recorded in the weight fields 1424 and 1524. The adjusted weights are recorded in the adjusted weight fields 1426 and 1526. The person who performed the measurements is recorded in the performed by fields 1428 and 1528. The hip, navel, and scrotal measurements are recorded in fields 1430, 1432, 1434, 1530, 1532, and 1534. Additionally, comments are recorded in the comments fields 1436 and 1536. Once the data is entered, the user can save the respective data by activating a save button 1438 and 1538.

C. Managing Animals and Their Movements

Figure 17:
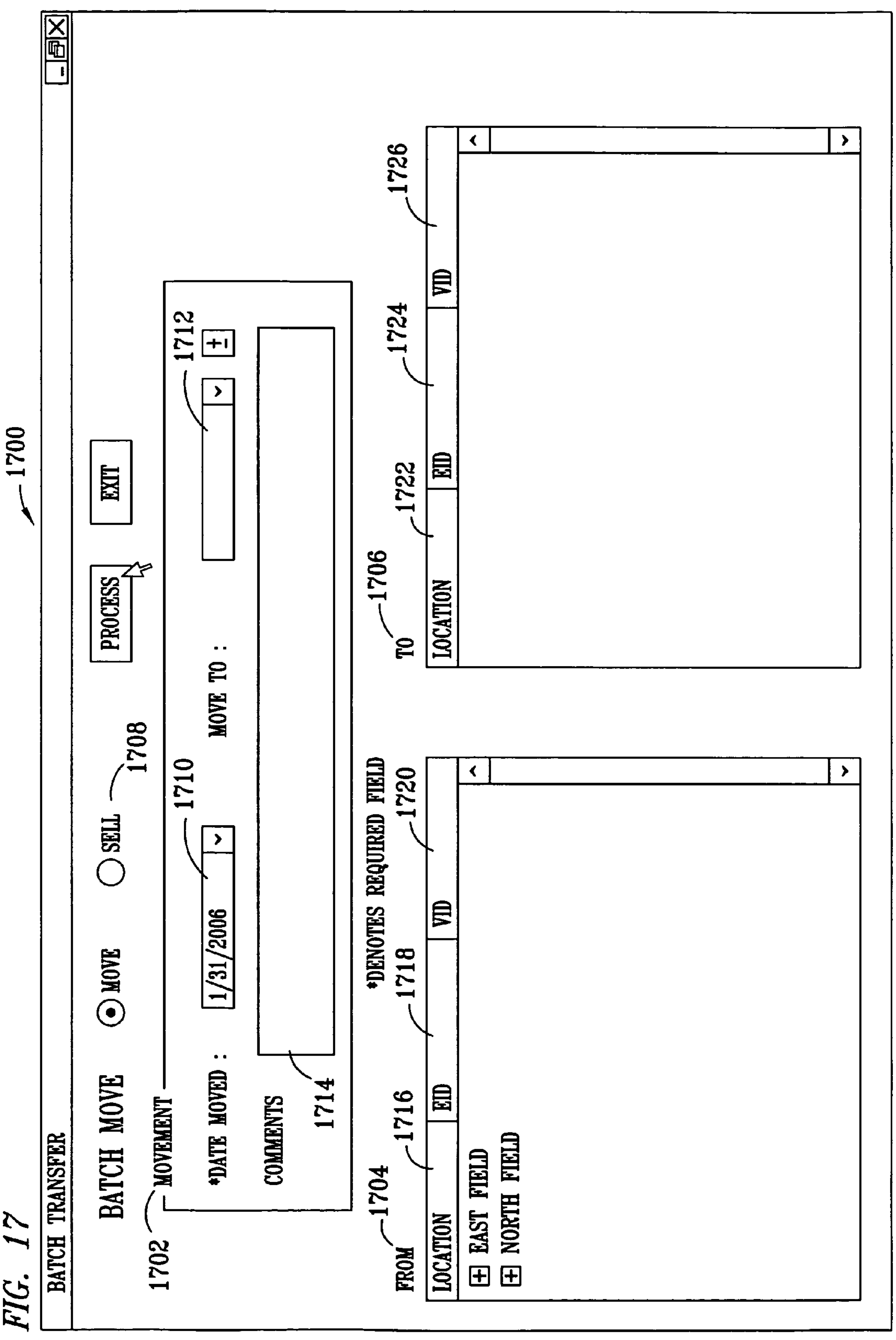
FIG. 17 is a menu for batch movements of livestock.

Referring to FIGS. 17 and 8 of the drawings the reference numerals 1700 and 800 generally refer to menus for movements of livestock. In particular, menu 1700 details batch movements of livestock, whereas menu 800, which is described above, detailed movements of individual animals.

As noted above, one particular requirement for compliance with the NAIS is reporting animal movements within a specified time period (presently 48 hours). Thus, easy notation and updates of animal movements can be important to system 100. If an entire herd or group of animals is being moved to a different location (which has a different PID), it would be time-consuming to transfer each individual animal. Therefore, menu 1700 allows for batch movements of animals.

Upon a change in status, of an animal a user can choose whether an animal is to be or has been moved or sold by activating selector 1708. Information pertaining the sale or movement of animals contained within the movement block 1702, array 1704, and array 1706. Specifically, movement block 1702 allows that user to enter the date of movement in date field 1710, the location to which animals have been moved in movement field 1712, and any comments in the comment field 1714.

Changes to the movement are reflected in arrays 1704 and 1706. Array 1704 denotes the location from which the animals are moving and includes an expandable location field 1716 that is associated with the moved animals that are indicated in the EID field 1718 and VID field 1720. Array 1706 denotes the location to which the animals are moving and includes an expandable location field 1722 that is associated with the moved animals that are indicated in the EID field 1724 and VID field 1726.

D. Managing Locations

Referring to FIGS. 18A, 18B, 19A, 19B, and 20 of the drawings, reference numeral 1800 depicts the location menu. The location menu 1800 allows the user to enter or edit locations/pastures where animals may be present. Because the NAIS requires that each location have a PID, users are responsible for maintaining records of what livestock have been present at different locations, which each have a PID.

Remembering lengthy PID numbers, though, can be very difficult, especially if a user is maintaining records for multiple locations that each individually have a PID. Additionally, each of the PIDs may be further subdivided, and thus, the user can give each location, subdivision, or area with a PID a simple and more easily remembered name by using menu 1800. The local DB 114 and remote DB 122 of system 100, to make tracking simpler, have created fields for ranches and other areas that may be further subdivided, so that large ranchers/farmers can employ the system 100 as well as the smaller rancher/farmer.

In editing, adding, or deleting locations, the user selects a ranch from a pull-down menu in the ranch field 1804. The ranches listed in the pull-down menu are added to the system 100 (in local DB 114 and/or remote DB 122) prior to the addition of different locations. After selecting the ranch, the location array 1806 is able to recall all locations that have been saved in the system 100 corresponding to the PID for that ranch. As can be seen in FIGS. 18A-20, there are four locations listed, as an example: North Field, South Field, East Field, and West Field.

Figures 18A, 18B:
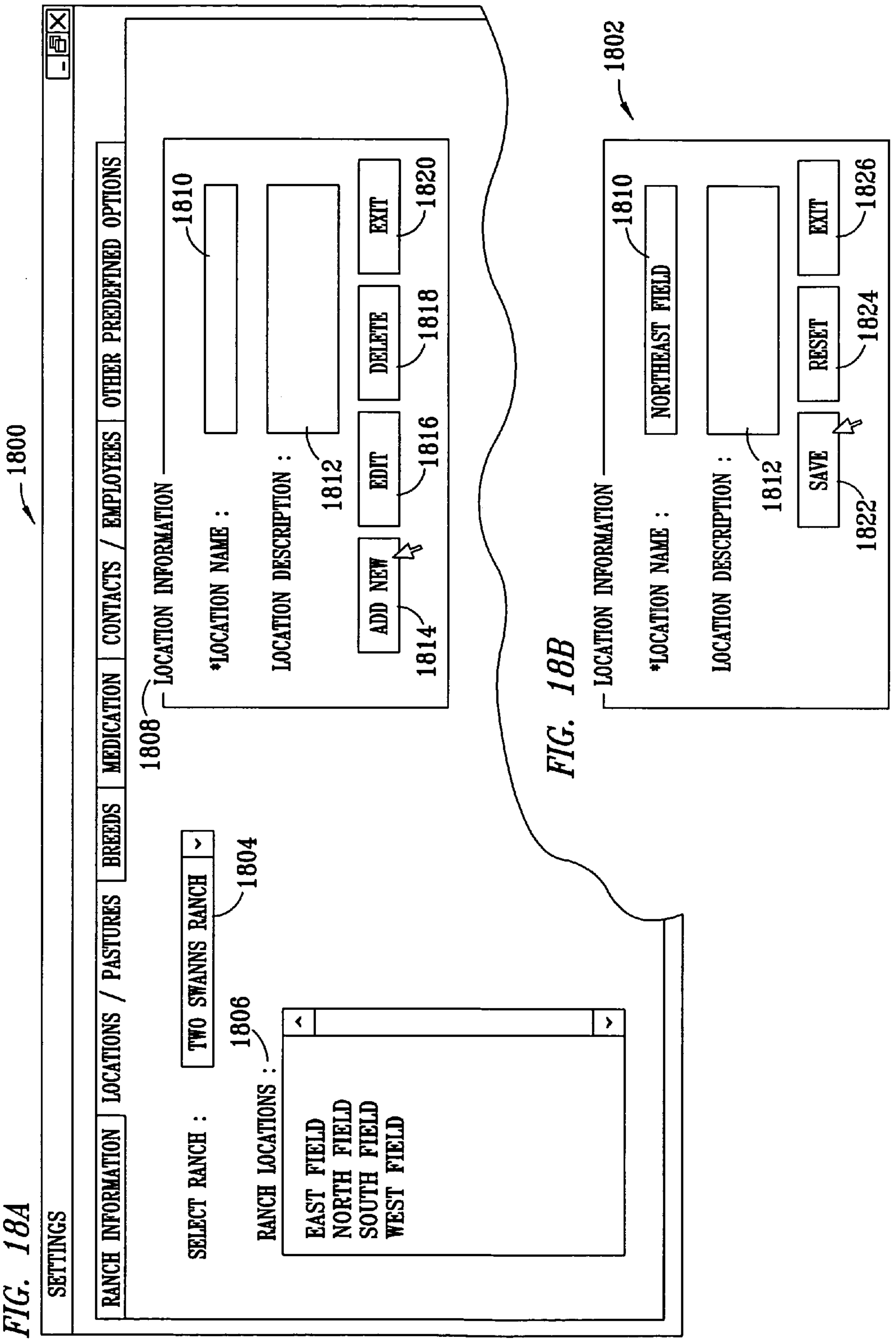
FIGS. 18A and 18B are menus for adding new locations.

To add a location for a selected ranch, a user would make a selection in the location information block. As shown in FIGS. 18A and 18B, the user would activate the "Add New" button 1814. By activating button 1814, menu 1802 would come up on the screen. Menu 1802 allows the user to enter in the name of the location in field 1810 and enter a description, which would include a PID, in the description field 1812. The system 100 would then be able to parse the description field 1812 and associate the PID with the name given by the user. Thus, the system 100 could then easily make electronic reports to the NAIS.

Figures 19A, 19B:
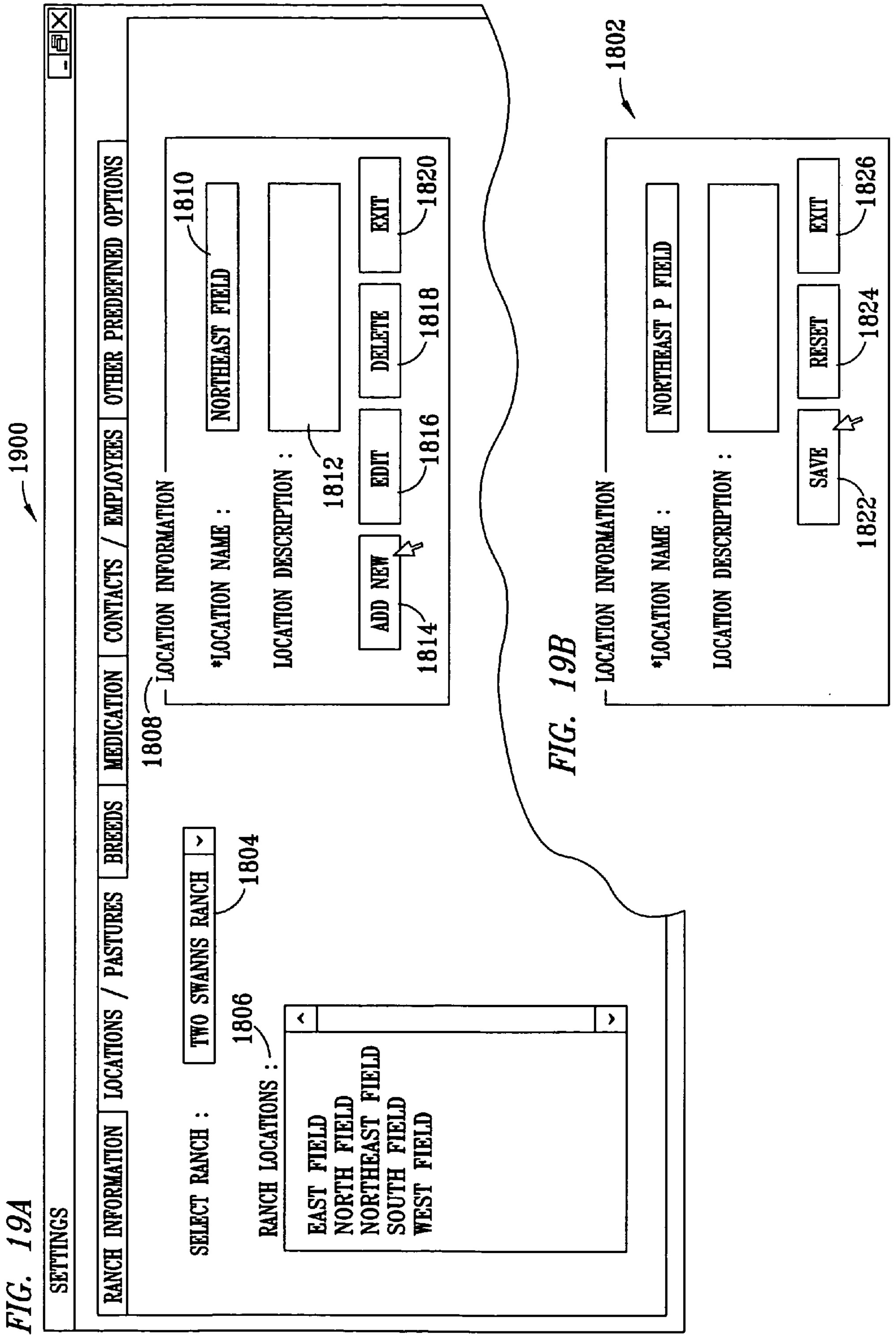
FIGS. 19A and 19B are menus for editing current locations.

To edit a location for a selected ranch, a user highlights and select the name of the location in array 1806. This selection would bring up the location name and description saved in fields 1810 and 1812 in block 1808, which would not be changeable. As shown in FIGS. 19A and 19B, to make changes to the selected location, the user would activate the "Edit" button 1816. Activation of button 1816 would bring up menu 1802, which would allow the user to access and change the information stored in fields 1810 and 1812.

Figure 20:
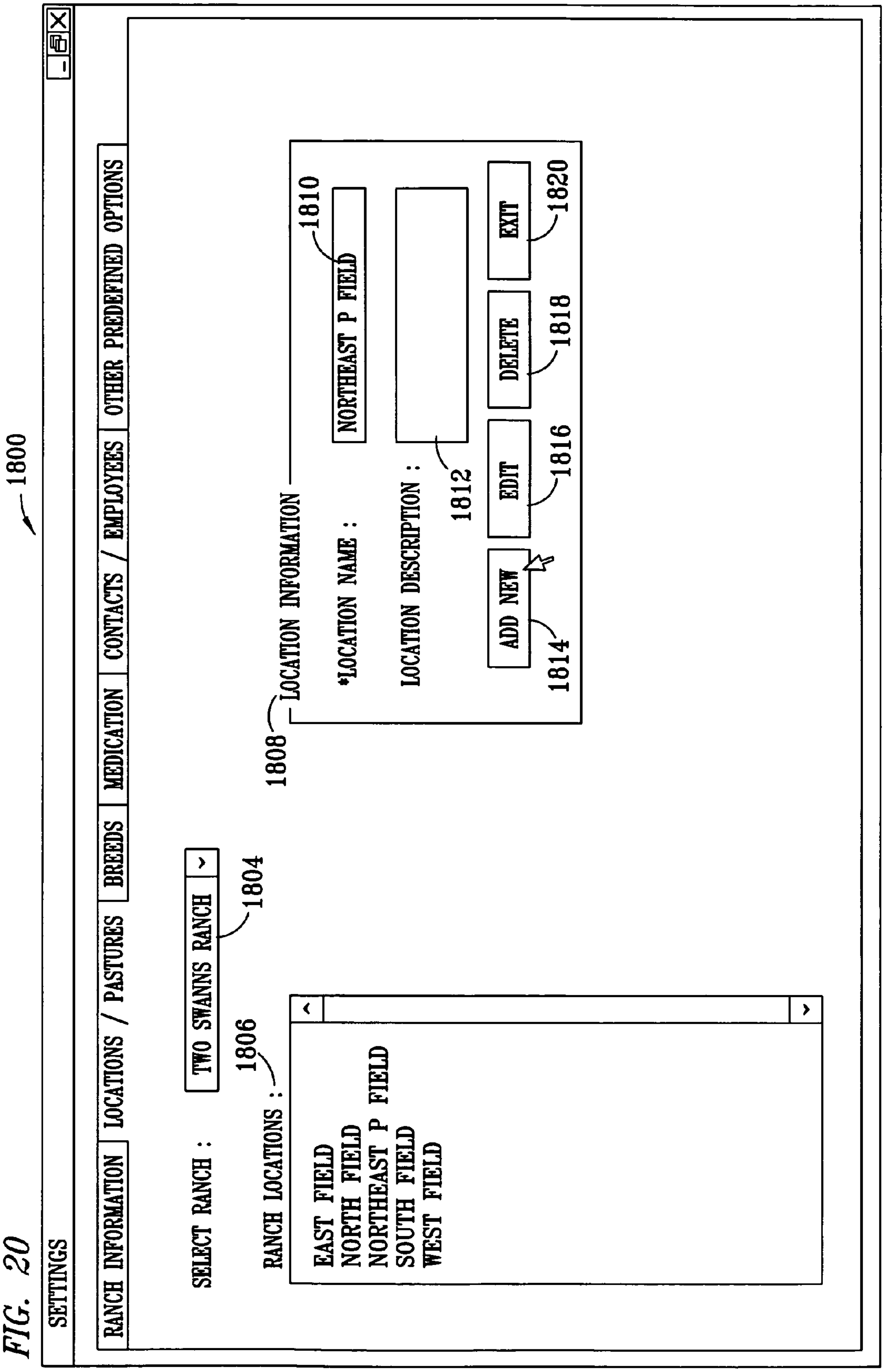
FIG. 20 is a menu for deleting a location.

To delete a location for a selected ranch, a user highlights and select the name of the location in array 1806. This selection would bring up the location name and description saved in fields 1810 and 1812 in block 1808, which would not be changeable. As shown in FIG. 20, the user would then activate the "Delete" button 1818. This deletion would then be reflected in local DB 114 and/or remote DB 122. However, records regarding this change would not be permanently deleted, but instead, record of the date and time of the deletion would be recorded in case the deleted information would need to be recalled at a later time due to error or compliance with a regulatory regime, such as the NAIS. Once the user has completed changes to the location, the user can discontinue use of menu 1800 by activating the "Exit" button 1820.

E. Reports

Figure 21:
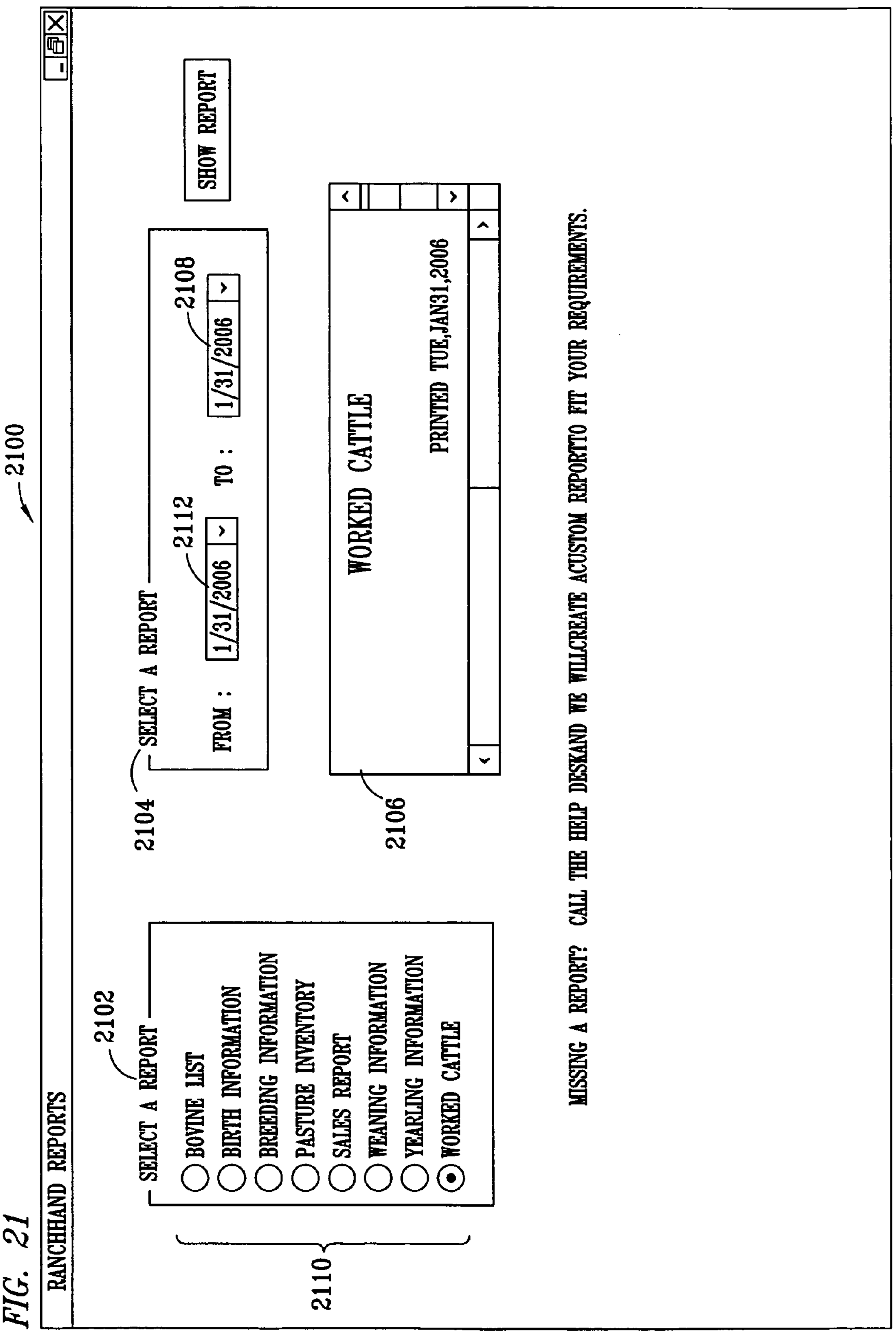
FIG. 21 is a menu for generating a report.

Referring to FIG. 21 of the drawings, the reference numeral 2100 generally designates a reporting menu. When a user desires to generate a report from data stored in the local DB 114 and/or the remote DB 122, menu 2100 allows the user to generate a variety of different reports.

In particular, menu 2100 is subdivided into several blocks: report block 2102, date block 2104, and title block 2106. In the report block 2102, the user is able to select among various reports by use of a selection button 2110. As shown in FIG. 20, there are eight reports from which the user can select, and, as an example, the report for "Worked Cattle" has been selected. Generally, the categories for which reports can be generated are predetermined; however, system 100 can be configured to have completely adjustable categories. Once a report has been selected, the user can select the dates from which data is to be compiled into the report by choosing a beginning date and an ending date in the date fields 2112 and 2108. Additionally, the title block 2106 allows the user to enter titling information for the report. Preferably, the default settings for the title block information include the name of the report as it appears in the report block 2102 and the date on which the report is printed.

The present invention as described above allows users to be able to easily and inexpensively use a computer system to track livestock in near real-time and maintain compliance with the NAIS. Thus, smaller farmers, ranchers, or livestock managers, who comprise 80% of the cattle produced in Texas, are able to comply with the NAIS without investment in the latest computing technology, broadband, etc. Additionally, larger organizations can also use the present invention as described above to remain in compliance with the NAIS with a fully-featured tracking program making efficient use of information technology.

F. On-Site Data Entry

Figure 22:
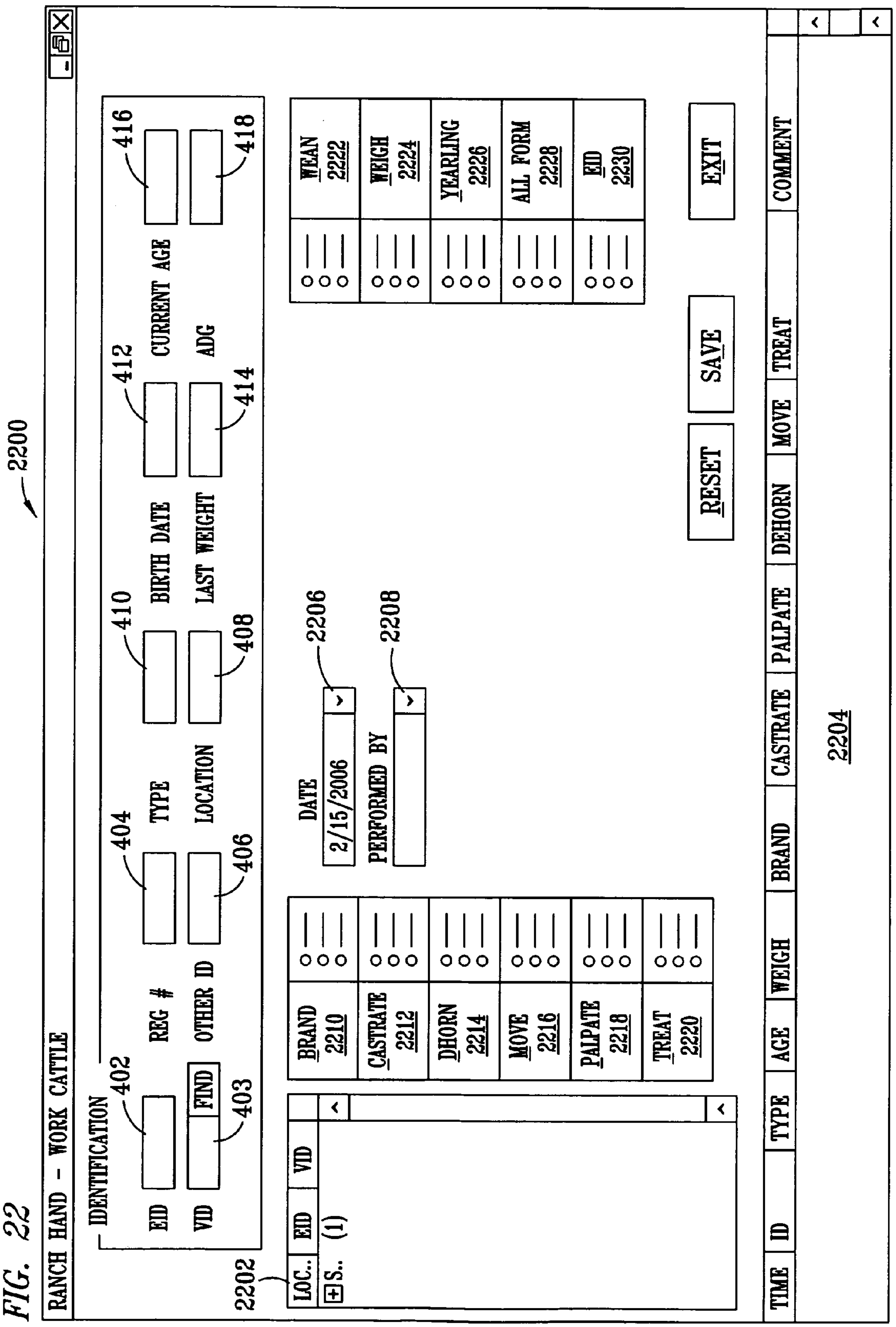
FIG. 22 is a working menu for a touch sensitive screen.

In addition to allowing farmers, ranchers, or livestock managers to enter information in the system 100 after tasks have been performed or are being performed with a standard keyboard and mouse, the system 100 allows for on-site data entry by use of a touch-sensitive screen. Referring to FIG. 22 of the drawings, the reference numeral 2200 generally refers to the working menu.

When a person is working in the field with one or more animals, it may oftentimes be more convenient to have a screen in which data can be entered without the use of other extraneous input equipment, such as mice and keyboards, because of the environment in which the data entry is occurring. When working with cattle, the environment is oftentimes very dirty, dusty, or muddy, which can substantially affect the functionality of extraneous data entry equipment, whereas a screen can simply be wiped off. A touch-sensitive screen often can be manipulated more easily than a keyboard or mouse, for example while wearing gloves.

To perform this task, a different menu is needed to enter data into the system 100, namely menu 2200. As detailed with FIG. 4 above, the top of the menu includes specific characteristic and identification information associated with a particular animal. The fields that can be associated with the animal identification or characteristic information are the EID field 402, VID field 403, registration number field 404, other identification field 406, the location field 408, the animal type field 410, the birthdate field 412, the last weight field 414, the current age field 416, and the ADG field 418, which are located at the top of menus 2200.

Also included with menu 2200 are a number arrays 2202 and 2204. Array 2202 is an array of cattle in a current batch. The batch is a selected number of animals where information (such as weight) regarding each of the animals is being updated. The batch stored in array 2202 is a subset of the total number of animals in system 100. Array 2204 is the global array of animals, of which the user can select particular animals to be added to a batch, which is reflected in array 2202.

Some other important information also needs to be included, namely the person performing the tasks and the time/date. In field 2206, the date (and time) of the event is recorded. In field 2208, the person who performed the task is selected from a pull-down menu.

The working portion of menu 2200, however, are the information buttons: brand button 2210, castrate button 2212, dehorn button 2214, move button 2216, palpate button 2218, treat button 2220, wean button 2222, weigh button 2224, yearling button 2226, All form button 2228, and EID button 2230. Each of these buttons is conspicuously located on the menu, allowing the user to easily identify the desired task to be performed on a specific animal. Additionally, each of these buttons can be configured to be accessed through a keyboard, mouse, or other input device in addition to being accessible through a touch sensitive screen.

Each of these different buttons allows the user to enter/update the desired data in the system 100. The brand button 2210 allows to the user to bring up a menu, such as menu 400, that allows entry of brand information. The castrate button 2212 allows the user to record the time and date of a castration. The dehorn button 2214 allows the user to enter in the time and date of a dehorning. The move button allows the user to bring up a menu, such as menu 800, to record animal movements. The palpate button 2218 allows the user to bring up a menu, such as menu 900, to record palpation information. The treat button 2220 allows the user to bring up a menu, such as menu 1100, to record treatment information. The wean button 2222 allows the user to bring up a menu, such as menu 1400, to enter weaning information. The weigh button 2224 allows the user to bring up a menu, such as menu 700, to record an updated weight. The yearling button 2226 allows the user to bring up a menu, such as menu 1500, to record yearling information. The all forms button 2228 allows to user to access other buttons not available on menu 2200 by bringing up other menus, such as menu 400. The EID button 2230 allows the user to bring up a menu, such as menu 400, to change an EID if necessary.

When an animal's information is brought up, either through manual entry or by electronic means, to be updated, the buttons which may be accessed are tailored specifically for the animal. For example, if a cow's information is to be updated, the castrate button 2212 will not be active. Thus, menu 2200 is dynamic and automatically updates when an animal is selected.

By having menu 2200, the flexibility of the system 100 is greatly increased. Specifically, menu 2200 enables the system 100 to operate on a palm computer or personal digital assistant (PDA). Another feature that allows for increased flexibility is the ability to have the system operate over different platforms, such as Windows® XP, Windows® CE, Linux®, MacOS®, and so forth. The menus can also include a multiple language feature to allow for persons who speak different languages, such as Spanish and English, to access and update data.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method in an electronic data processing system for maintaining licensure of livestock management software, comprising the steps of:

initiating the livestock management software on a local computer;

accessing an initial key stored on the local computer, the initial key being generated at least from an electronic identification number (EID) and a premise identification number (PID) for at least one animal;

parsing the initial key for a lock data;

comparing the lock data to a predetermined lock condition to determine if the livestock management software has expired;

requesting the user of the local computer to synchronize with a remote computer over a computer network if the livestock management software has expired;

accessing one of a remote database or a local database, each database having the indicia of livestock stored thereon;

calculating a new key from at least the EID and the PID for at least one animal indicia of livestock stored by the livestock management software and one of Media Access Control (MAC) or Internet Protocol (IP) address of the local computer to authenticate the live stock management software, if synchronization is requested: and operating the livestock management software normally unless the livestock management software has expired.

2. The method of claim 1, wherein the lock data is a date and the predetermined lock condition is an expiration date.

3. The method of claim 1, wherein the method further comprises the steps of:

requesting the user to enter initial livestock data;

storing the initial livestock data into the livestock management software; and generating an expiration date into the livestock management software.

4. The method of claim 1, wherein the method further comprises: determining the MAC address for the local computer; and calculating an initial key at least from the MAC address.

5. A system comprising:

a local computer including:

a local database that at least contains an electronic identification number (EID) and a premise identification number (PID) for at least one animal;

a Media Access Control (MAC) address;

an Internet Protocol (IP) address;

a local interface adapted to communicate with at least one computer network; and a local controller which provides control instruction to the local database and the local interface, wherein the local controller includes a lock detector which prevents user access to the local database if a predetermined lock condition is met; and a remote database that at least contains the EID and the PID for at least one animal;

a key generator which generates a key at least from on the IP address or the MAC address and from the EID and the PID for at least one animal, wherein the key provides at least a reset of the predetermined lock condition by authentication; and a remote controller which provides control instructions to the remote database, the key generator, and the local controller.

6. The system of claim 5, wherein the remote controller provides at least one control instruction to the local controller through an intervention by at least one human operator.

7. The system of claim 5, wherein the remote controller provides at least one control instruction to the local controller over the computer network.

8. The system of claim 5, wherein the local database at least contains livestock data and user data.

9. The system of claim 5, wherein the system further comprises a second local database that at least contains user data.

10. The system of claim 5, wherein the lock condition is a use period.

11. The system of claim 5, wherein the livestock are cattle.

* * * * *